United States Patent
Nishide et al.

(10) Patent No.: US 10,164,258 B2
(45) Date of Patent: Dec. 25, 2018

(54) FUSED-RING QUINONE-SUBSTITUTED POLYNORBORNENE, ELECTRODE ACTIVE MATERIAL AND SECONDARY BATTERY

(71) Applicants: WASEDA UNIVERSITY, Tokyo (JP); NISSAN CHEMICAL INDUSTRIES, LTD., Tokyo (JP)

(72) Inventors: Hiroyuki Nishide, Tokyo (JP); Kenichi Oyaizu, Tokyo (JP); Takuma Kawai, Tokyo (JP); Satoshi Nakao, Tokyo (JP); Takuji Yoshimoto, Funabashi (JP)

(73) Assignees: WASEDA UNIVERSITY, Tokyo (JP); NISSAN CHEMICAL INDUSTRIES, LTD., Tokyo (JP)

( * ) Notice: Subject to any disclaimer, the term of this patent is extended or adjusted under 35 U.S.C. 154(b) by 283 days.

(21) Appl. No.: 15/064,802

(22) Filed: Mar. 9, 2016

(65) Prior Publication Data

US 2017/0104214 A1  Apr. 13, 2017

(30) Foreign Application Priority Data

Oct. 8, 2015  (JP) .................................. 2015-200078

(51) Int. Cl.
*H01M 4/60* (2006.01)
*C08G 61/08* (2006.01)
(Continued)

(52) U.S. Cl.
CPC ........... *H01M 4/608* (2013.01); *C08F 116/36* (2013.01); *C08G 61/08* (2013.01); *H01G 11/48* (2013.01);
(Continued)

(58) Field of Classification Search
CPC ...... H01M 4/608; H01M 4/606; H01M 12/06; H01M 12/08; H01M 2004/028;
(Continued)

(56) References Cited

FOREIGN PATENT DOCUMENTS

| JP | 2002-117852 A | 4/2002 |
| JP | 2008-147015 A | 6/2008 |

(Continued)

OTHER PUBLICATIONS

Oyaizu et al. Membrane (2013) 38 (3) 131-136, (Year: 2013).*
(Continued)

*Primary Examiner* — Peter F Godenschwager
*Assistant Examiner* — Andrew J. Oyer
(74) *Attorney, Agent, or Firm* — Birch, Stewart, Kolasch & Birch, LLP

(57) ABSTRACT

A fused-ring quinone-substituted polynorbornene has recurring units of formula (1) and/or (2) below.

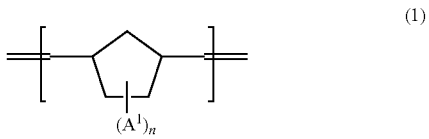

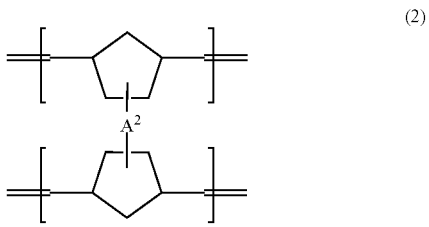

In formulas (1) and (2), $A^1$ is independently a substituent of formula (3) or (4) below, n is an integer from 1 to 6, and $A^2$ is a substituent of formula (5) or (6) below.

(Continued)

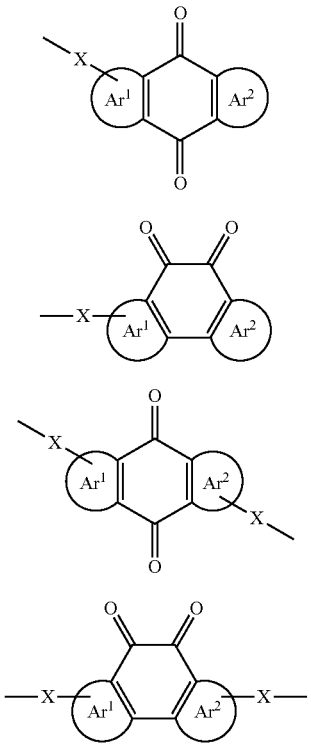

In formulas (3) to (6), each X is independently a single bond or a divalent group, and $Ar^1$ and $Ar^2$ are each independently an aromatic hydrocarbon ring or an oxygen atom or sulfur atom-containing aromatic heterocycle that forms together with two carbon atoms on a benzoquinone skeleton. This polymer has charge-storing properties and, when used as an electrode active material, is capable of providing a high-performance battery possessing high capacity, high rate characteristics and high cycle characteristics.

13 Claims, 13 Drawing Sheets

(51) Int. Cl.
*H01G 11/48* (2013.01)
*H01M 12/06* (2006.01)
*C08F 116/36* (2006.01)
*H01M 12/08* (2006.01)
*H01M 4/02* (2006.01)
*H01M 10/0525* (2010.01)

(52) U.S. Cl.
CPC ........... *H01M 4/606* (2013.01); *H01M 12/06* (2013.01); *C08G 2261/142* (2013.01); *C08G 2261/148* (2013.01); *C08G 2261/149* (2013.01); *C08G 2261/3324* (2013.01); *C08G 2261/418* (2013.01); *H01M 10/0525* (2013.01); *H01M 12/08* (2013.01); *H01M 2004/028* (2013.01); *Y02E 60/128* (2013.01)

(58) Field of Classification Search
CPC ............... H01M 10/0525; C08G 61/08; C08G 2261/148; C08G 2261/142; C08G 2261/418; C08G 2261/3324; C08G 2261/149; H01G 11/48; C08F 116/36; Y02E 60/128
See application file for complete search history.

(56) References Cited

FOREIGN PATENT DOCUMENTS

| | | | |
|---|---|---|---|
| JP | 2009-217992 | A | 9/2009 |
| JP | 2010-44882 | A | 2/2010 |
| JP | 2010-55923 | A | 3/2010 |
| JP | 2010-80343 | A | 4/2010 |
| JP | 2010-212152 | A | 9/2010 |

OTHER PUBLICATIONS

Zhu et al. Journal of Electroanalytical Chemistry 688 (2013) 118-122 (Year: 2013).*
Kawai et al., High-Density and Robust Charge Storage with Poly(anthraquinone-substituted norbornene) for Organic Electrode-Active Materials in Polymer—Air Secondary Batteries ,Macromolecules, 2015, 48 (8), pp. 2429-2434 (Year: 2015).*
Nakahara et al., "Rechargeable batteries with organic radical cathodes," Chemical Physics Letters (Jun. 27, 2002), vol. 359, pp. 351-354.
Nishide, H. and T. Suga, "Organic Radical Battery," The Electrochemical Society Interface (Winter 2005), vol. 14, pp. 32-36.
Uemachi et al., "Poly(1,4-phenylene-1,2,4-dithiazole-3',5'-yl): the new redox system for lithium secondary batteries," Electrochimica Acta (2001), vol. 46, pp. 2305-2312.
Visco et al., "A Novel Class of Organosulfur Electrodes for Energy Storage," J. Electrochem. Soc., (Mar. 1989), vol. 136, No. 3, pp. 661-664.
Vlad et al., "Hybrid supercapacitor-battery materials for fast electrochemical charge storage," Scientific Reports (Mar. 7, 2014), vol. 4, pp. 4315-4321.

* cited by examiner

FUSED-RING QUINONE-SUBSTITUTED POLYNORBORNENE, ELECTRODE ACTIVE MATERIAL AND SECONDARY BATTERY

CROSS-REFERENCE TO RELATED APPLICATION

This non-provisional application claims priority under 35 U.S.C. § 119(a) on Patent Application No. 2015-200078 filed in Japan on Oct. 8, 2015, the entire contents of which are hereby incorporated by reference.

TECHNICAL FIELD

This invention relates to fused-ring quinone-substituted polynorbornenes and to electrode active materials and secondary batteries made using the mentioned materials.

BACKGROUND ART

Organic secondary batteries, which are rechargeable batteries that use an organic charge storage material as an electrode active material in the battery, are attracting considerable attention on account of such features as their high rate characteristics, high capacity retention with charge-discharge cycling, lightweight thin-film construction and potential physical flexibility. Nitroxyl radical-containing compounds are often used as the organic charge storage material (*Chem. Phys. Lett.* 359, 351-354 (2002); *Electrochem. Soc. Interface* 14, 32-36 (2005); JP-A 2002-117852), although the use of organosulfur polymers (*J. Electrochem. Soc.* 136, 661-664 (1989); *Electrochimica Acta* 46, 2305-2312 (2001)), quinone polymers (JP-A 2009-217992), quinoid materials (JP-A 2010-44882, JP-A 2010-55923, JP-A 2010-80343), dione materials (JP-A 2010-212152) and rubeanic acid-based materials (JP-A 2008-147015) has also been reported.

In recent years, it has been shown that, by using an organic charge storage material in the presence of an inorganic electrode active material, the capacity and voltage retention (collectively referred to below as the "rate characteristics") during high-speed charge and discharge of a lithium ion battery and the capacity retention (referred to below as the "cycle characteristics") in charge-discharge cycling can be improved (*Scientific Reports* 4, 4315-4321 (2014)), thus expanding applicable uses and methods for organic charge storage materials.

CITATION LIST

Patent Document 1: JP-A 2002-117852
Patent Document 2: JP-A 2009-217992
Patent Document 3: JP-A 2010-44882
Patent Document 4: JP-A 2010-55923
Patent Document 5: JP-A 2010-80343
Patent Document 6: JP-A 2010-212152
Patent Document 7: JP-A 2008-147015
Non-Patent Document 1: *Chem. Phys. Lett.* 359, 351-354 (2002)
Non-Patent Document 2: *Electrochem. Soc. Interface* 14, 32-36 (2005)
Non-Patent Document 3: *J. Electrochem. Soc.* 136, 661-664 (1989)
Non-Patent Document 4: *Electrochimica Acta* 46, 2305-2312 (2001)
Non-Patent Document 5: *Scientific Reports* 4, 4315-4321 (2014)

SUMMARY OF THE INVENTION

Batteries which use nitroxyl radical-containing charge storage materials as the electrode active material have a smaller charge storage capacity than batteries which use inorganic electrode active materials. When organic charge storage materials having a high capacity were used, such as organosulfur polymers, drawbacks have included a low electrochemical stability and the inability to obtain sufficient cycle characteristics. Other organic charge storage materials as well, when used alone as the electrode active material or when used together with an inorganic electrode active material, typically lack, for example, sufficient resistance to dissolution by the electrolyte solution, swellability that enables sufficient ion ingress and egress, ionic conductivity, and bindability with the inorganic electrode active material and current collector. Hence, satisfactory performance as a secondary battery, particularly a lithium ion battery, has sometimes been unattainable.

It is therefore an object of this invention to provide a material having charge storing properties which, when used as an electrode active material, is capable of giving a high-performance battery that possess high capacity, high rate characteristics and high cycle characteristics.

The inventors have found that polymers which include a polynorbornene structure as the main chain and a fused-ring quinone structure on side chains function as charge storage materials and that when such polymers are used as electrode active materials, they resolve the above problems, providing a high-performance secondary battery having a high capacity, high rate characteristics and high cycle characteristics.

Accordingly, in one aspect, the invention provides a fused-ring quinone-substituted polynorbornene having recurring units of formula (1) and/or (2) below

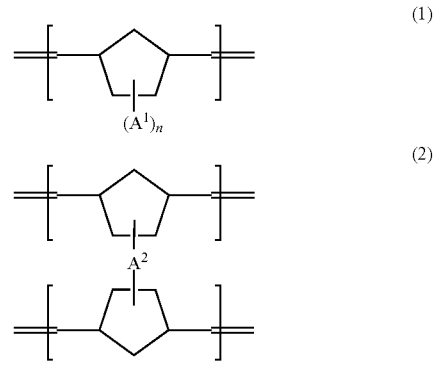

wherein each $A^1$ is independently a substituent of formula (3) or (4) below, n is an integer from 1 to 6, and $A^2$ is a substituent of formula (5) or (6) below.

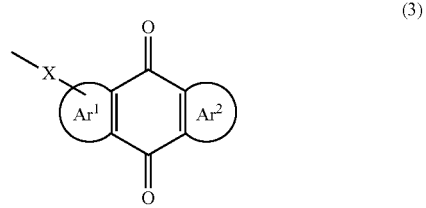

(4)

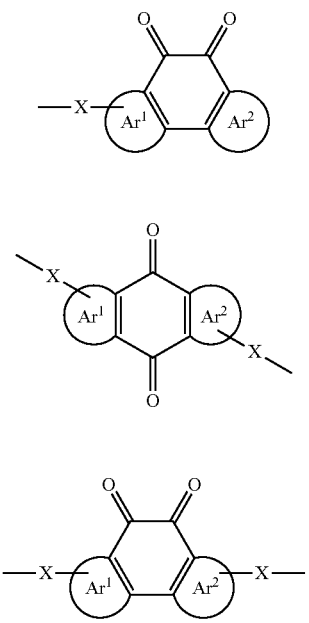

(5)

(6)

In formulas (3) to (6), each X is independently a single bond or a divalent group, and $Ar^1$ and $Ar^2$ are each independently an aromatic hydrocarbon ring or an oxygen atom- or sulfur atom-containing aromatic heterocycle that forms together with two carbon atoms on a benzoquinone skeleton.

In a preferred embodiment of the fused-ring quinone-substituted polynorbornene of the invention, the aromatic hydrocarbon ring is a benzene ring and the aromatic heterocycle is a thiophene ring. This fused quinone-substituted polynorbornene preferably contains recurring units of formula (1-1), (1-2) and/or (1-3) below.

(1-1)

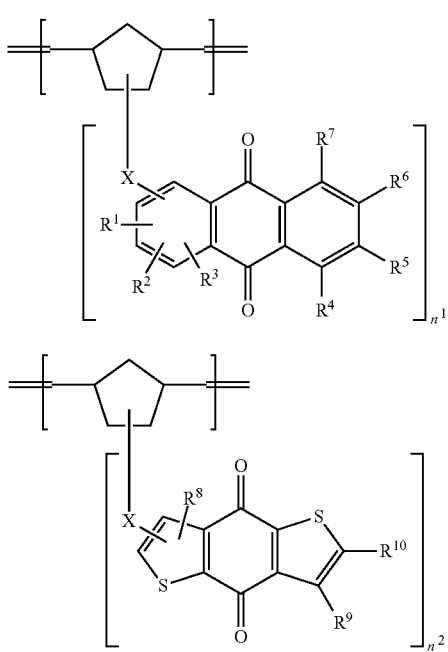

(1-2)

(1-3)

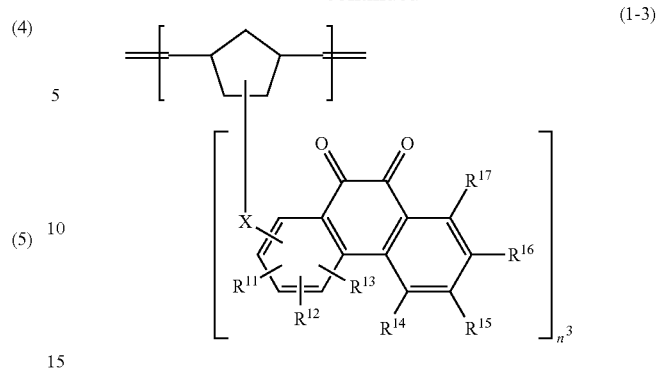

Here, X is as defined above; $R^1$ to $R^{17}$ are each independently a hydrogen atom, a halogen atom, a hydroxyl group, a mercapto group, an amino group, a substituted or unsubstituted alkyl group of 1 to 12 carbon atoms, a substituted or unsubstituted alkenyl group of 2 to 12 carbon atoms, a substituted or unsubstituted alkynyl group of 2 to 12 carbon atoms, a substituted or unsubstituted aryl group of 6 to 12 carbon atoms, a substituted or unsubstituted heteroaryl group of 3 to 12 carbon atoms, a substituted or unsubstituted alkoxy group of 1 to 12 carbon atoms, a substituted or unsubstituted alkylthio group of 1 to 12 carbon atoms, a substituted or unsubstituted monoalkylamino group of 1 to 12 carbon atoms, a dialkylamino group in which each alkyl group is independently a substituted or unsubstituted alkyl group of 1 to 12 carbon atoms, or an alkylcarbonyl group of 2 to 12 carbon atoms; and $n^1$, $n^2$ and $n^2$ are each independently 1 or 2.

In another aspect, the invention provides a charge storage material containing the foregoing fused-ring quinone-substituted polynorbornene.

In yet another aspect, the invention provides an electrode active material which includes this charge storage material.

In still another aspect, the invention provides an electrode slurry containing this electrode active material and a solvent.

In a further aspect, the invention provides a thin-film containing this electrode active material.

In a still further aspect, the invention provides a thin-film produced from the foregoing electrode slurry.

In an additional aspect, the invention provides an electrode containing the foregoing electrode active material.

In another aspect, the invention provides an electrode containing either of the foregoing thin-films.

In yet another aspect, the invention provides a secondary battery containing either of the foregoing electrodes.

In a further aspect, the invention provides a lithium ion battery containing either of the foregoing electrodes.

In a still further aspect, the invention provides an air battery containing either of the foregoing electrodes.

Advantageous Effects of the Invention

Because the fused-ring quinone-substituted polynorbornene of the invention has a fused-ring quinone skeleton that serves as the primary charge reservoir and is stabilized by a fused-ring structure where two anion radicals form, it has a high electrochemical stability and is thus useful as a charge storage material. Moreover, because two-electron reduction proceeds, forming a stable dianion, when this polymer is used as an electrode active material in a battery, high stability and high capacity are both achieved.

Because the fused-ring quinone-substituted polynorbornene of the invention includes a polynorbornene structure as the main chain, even without having a crosslinked structure, it possesses a high resistance to electrolyte solutions, thus inhibiting dissolution to electrolyte solutions. In addition, the electrochemical stability and physical stability are both high, and so the deterioration in capacity with charge/discharge cycling can be minimized. Also, with regard to the polynorbornene structure, because polymerization to give this structure and the formation of a graft structure with ring-fused quinone can be achieved at a minimal molecular weight, high capacity is retained in charging and discharging.

Owing to these effects, by using the fused-ring quinone-substituted polynorbornene of the invention as an electrode active material, it is possible to manufacture secondary batteries having high rate characteristics, high capacity and high cycle characteristics. The fused-ring quinone-substituted polynorbornene of the invention is particularly suitable as an electrode active material for lithium ion batteries. In ordinary secondary batteries, an inorganic material or carbon material is used as the electrode active material. It is possible to replace either the positive electrode or the negative electrode in such batteries with an electrode containing the fused-ring quinone-substituted polynorbornene of the invention, or to use the fused-ring quinone-substituted polynorbornene of the invention in combination with an electrode active material that is made of an inorganic material or a carbon material.

BRIEF DESCRIPTION OF THE DIAGRAMS

DETAILED DESCRIPTION OF THE INVENTION

Fused-Ring Quinone-Substituted Polynorbornene

Figure 1:
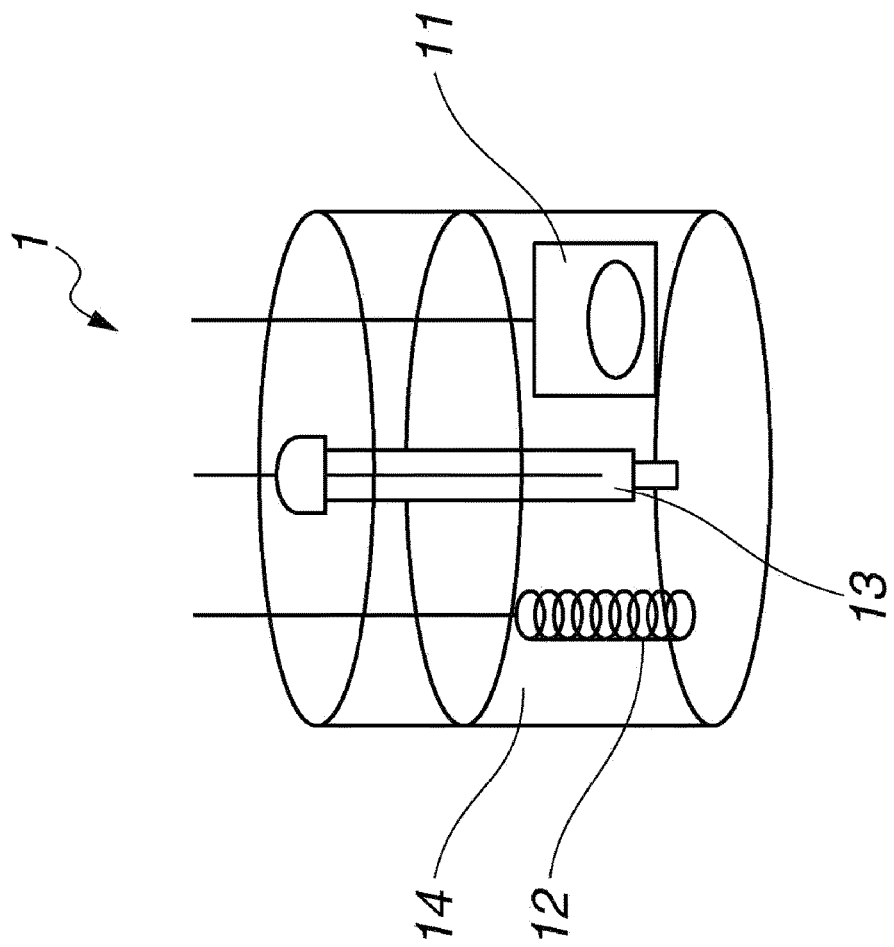
FIG. 1 is a schematic view of a beaker cell produced in the working examples of the invention.

The fused-ring quinone-substituted polynorbornene of the invention includes the recurring units of formula (1) and/or (2) below.

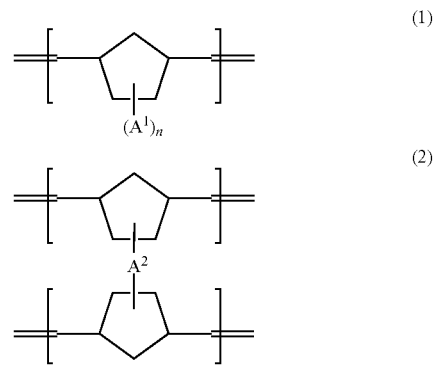

In formula (1), n is an integer from 1 to 6, with 1 or 2 being preferred. Each $A^1$ is independently a substituent of formula (3) or (4) below, and $A^2$ is a substituent of formula (5) or (6) below.

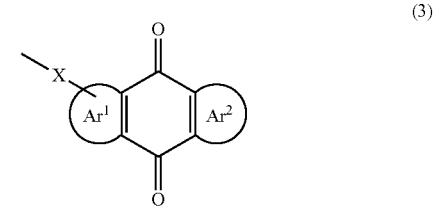

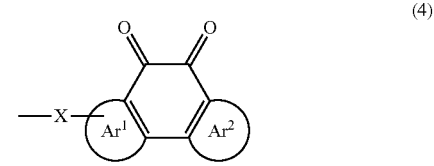

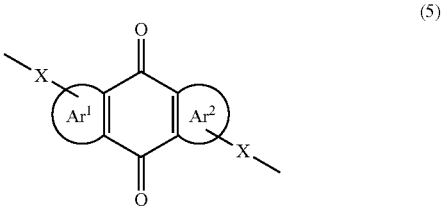

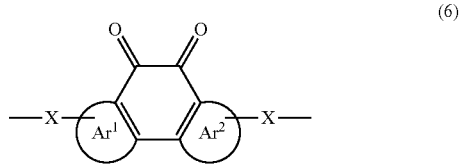

In these formulas, each X is independently a single bond or a divalent group. Preferred divalent groups include —C(O)O—, —C(O)OCH$_2$—, —CH$_2$O—, —C(O)NH—, —C(O)NHCH$_2$—, —CH$_2$—, —O—, —S— and —NH—, with a single bond, —C(O)O— or —C(O)OCH$_2$— being more preferred. Ar$^1$ and Ar$^2$ are each independently an aromatic hydrocarbon ring or an oxygen atom or sulfur atom-containing aromatic heterocycle that forms together with two carbon atoms on a benzoquinone skeleton.

The aromatic hydrocarbon ring is preferably a benzene ring. Preferred examples of the aromatic heterocycle include a thiophene ring and a furan ring. Of these, a benzene ring or a thiophene ring is especially preferred.

In the fused-ring quinone-substituted polynorbornene of the invention, for uniform electrode slurry formation, for affinity with the electrolyte solution and to ensure a redox capacity, the content of recurring units of formula (1) is preferably at least 50 mol %, more preferably at least 80 mol %, and even more preferably 100 mol %, of all the recurring units.

The fused-ring quinone-substituted polynorbornene of the invention preferably includes recurring units of formulas (1-1), (1-2) and/or (1-3) below.

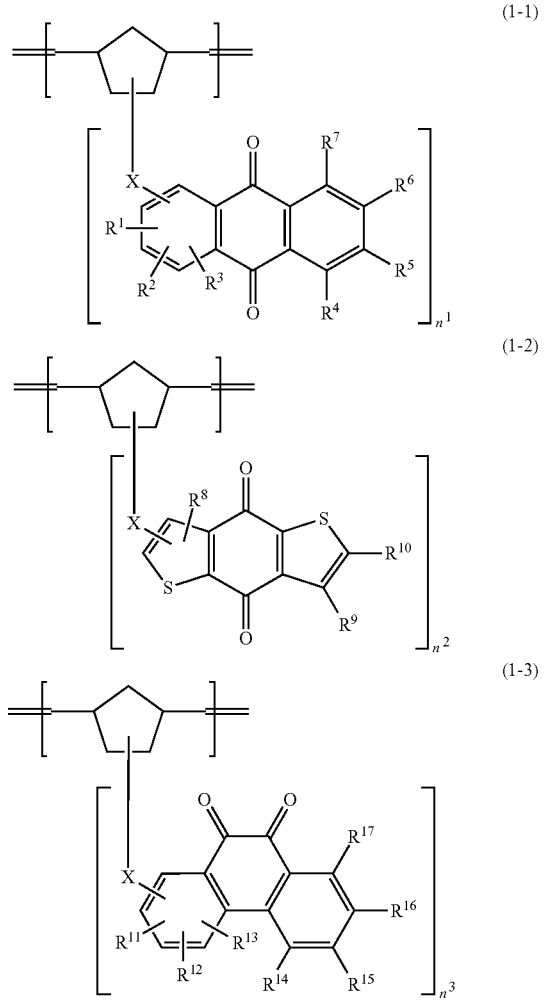

In these formulas, X is as defined above. R$^1$ to R$^{17}$ are each independently a hydrogen atom, a halogen atom, a hydroxyl group, a mercapto group, an amino group, a substituted or unsubstituted alkyl group of 1 to 12 carbon atoms, a substituted or unsubstituted alkenyl group of 2 to 12 carbon atoms, a substituted or unsubstituted alkynyl group of 2 to 12 carbon atoms, a substituted or unsubstituted aryl group of 6 to 12 carbon atoms, a substituted or unsubstituted heteroaryl group of 3 to 12 carbon atoms, a substituted or unsubstituted alkoxy group of 1 to 12 carbon atoms, a substituted or unsubstituted alkylthio group of 1 to 12 carbon atoms, a substituted or unsubstituted monoalkylamino group of 1 to 12 carbon atoms, a dialkylamino group in which each alkyl group is independently a substituted or unsubstituted alkyl group of 1 to 12 carbon atoms, or an alkylcarbonyl group of 2 to 12 carbon atoms. Also, n$^1$, n$^2$ and n$^3$ are each independently 1 or 2.

The halogen atom is exemplified by a fluorine atom, a chlorine atom, a bromine atom and an iodine atom.

The alkyl group may be linear, branched or cyclic. Illustrative examples include methyl, ethyl, n-propyl, i-propyl, c-propyl, n-butyl, i-butyl, s-butyl, t-butyl, c-butyl, 1-methyl-c-propyl, 2-methyl-c-propyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, c-pentyl, 1-methyl-c-butyl, 2-methyl-c-butyl, 3-methyl-c-butyl, 1,2-dimethyl-c-propyl, 2,2-dimethyl-c-propyl, 2,3-dimethyl-c-propyl, 1-ethyl-c-propyl, 2-ethyl-c-propyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, c-hexyl, 1-methyl-c-pentyl, 2-methyl-c-pentyl, 3-methyl-c-pentyl, 1-ethyl-c-butyl, 2-ethyl-c-butyl, 3-ethyl-c-butyl, 1,2-dimethyl-c-butyl, 1,3-dimethyl-c-butyl, 2,2-dimethyl-c-butyl, 2,3-dimethyl-c-butyl, 2,4-dimethyl-c-butyl, 3,3-dimethyl-c-butyl, 1-n-propyl-c-propyl, 2-n-propyl-c-propyl, 1-i-propyl-c-propyl, 2-i-propyl-c-propyl, 1,2,2-trimethyl-c-propyl, 1,2,3-trimethyl-c-propyl, 2,2,3-trimethyl-c-propyl, 1-ethyl-2-methyl-c-propyl, 2-ethyl-1-methyl-c-propyl, 2-ethyl-2-methyl-c-propyl, 2-ethyl-3-methyl-c-propyl, n-heptyl, n-octyl, n-nonyl, n-decyl, n-undecyl and n-dodecyl groups.

The alkenyl group may be linear, branched or cyclic. Illustrative examples include ethenyl, 1-propenyl, 2-propenyl, 1-methyl-1-ethenyl, 1-n-butenyl, 2-n-butenyl, 3-n-butenyl, 2-methyl-1-propenyl, 2-methyl-2-propenyl, 1-ethylethenyl, 1-methyl-1-propenyl, 1-methyl-2-propenyl, 1-n-pentenyl, 2-n-pentenyl, 3-n-pentenyl, 4-n-pentenyl, 1-n-propylethenyl, 1-methyl-1-n-butenyl, 1-methyl-2-n-butenyl, 1-methyl-3-n-butenyl, 2-ethyl-2-propenyl, 2-methyl-1-n-butenyl, 2-methyl-2-n-butenyl, 2-methyl-3-n-butenyl, 3-methyl-1-n-butenyl, 3-methyl-2-n-butenyl, 3-methyl-3-n-butenyl, 1,1-dimethyl-2-propenyl, 1-i-propylethenyl, 1-2-dimethyl-1-n-propenyl, 1,2-dimethyl-2-n-propenyl, 1-c-pentenyl, 2-c-pentenyl, 3-c-pentenyl, 1-n-hexenyl, 2-n-hexenyl, 3-n-hexenyl, 4-n-hexenyl, 5-n-hexenyl, 1-methyl-1-n-pentenyl, 1-methyl-2-n-pentenyl, 1-methyl-3-n-pentenyl, 1-methyl-4-n-pentenyl, 1-n-butylethenyl, 2-methyl-1-n-pentenyl, 2-methyl-2-n-pentenyl, 2-methyl-3-n-pentenyl, 2-methyl-4-n-pentenyl, 2-n-propyl-2-n-propenyl, 3-methyl-1-n-pentenyl, 3-methyl-2-n-pentenyl, 3-methyl-3-n-pentenyl, 3-methyl-4-n-pentenyl, 3-ethyl-3-n-butenyl, 4-methyl-1-n-pentenyl, 4-methyl-2-n-pentenyl, 4-methyl-3-n-pentenyl, 4-methyl-4-n-pentenyl, 1,1-dimethyl-2-n-butenyl, 1,1-dimethyl-3-n-butenyl, 1,2-dimethyl-1-n-butenyl, 1,2-dimethyl-2-n-butenyl, 1,2-dimethyl-3-n-butenyl, 1-methyl-2-ethyl-2-n-propenyl, 1-s-butylethenyl, 1,3-dimethyl-1-n-butenyl, 1,3-dimethyl-2-n-butenyl, 1,3-dimethyl-3-n-butenyl, 1-i-butylethenyl, 2,2-dimethyl-3-n-butenyl, 2,3-dimethyl-1-n-butenyl, 2,3-dimethyl-2-n-butenyl, 2,3-dimethyl-3-n-butenyl, 2-i-propyl-2-n-propenyl, 3,3-dimethyl-1-n-butenyl, 1-ethyl-1-n-butenyl, 1-ethyl-2-n-butenyl, 1-ethyl-3-n-butenyl, 1-n-propyl-1-n-propenyl, 1-n-propyl-2-n-propenyl, 2-ethyl-1-n-butenyl, 2-ethyl-2-n-butenyl, 2-ethyl-3-n-butenyl, 1,1,2-trimethyl-2-propenyl, 1-t-butylethenyl, 1-methyl-1-ethyl-2-propenyl, 1-ethyl-2-methyl-1-n-propenyl, 1-ethyl-2-methyl-2-propenyl, 1-i-propyl-1-propenyl, 1-i-propyl-2-n-propenyl, 1-methyl-2-c-pentenyl, 1-methyl-3-c-pentenyl, 2-methyl-1-c-pentenyl, 2-methyl-2-c-pentenyl, 2-methyl-3-c-pentenyl, 2-methyl-4-c-pentenyl, 2-methyl-5-c-pentenyl, 2-methylene-c-pentyl, 3-methyl-1-c-pentenyl, 3-methyl-2-c-pentenyl, 3-methyl-3-c-pentenyl, 3-methyl-4-c-pentenyl, 3-methyl-5-c-pentenyl, 3-methylene-c-pentyl, 1-c-hexenyl, 2-c-hexenyl and 3-c-hexenyl groups.

The alkynyl group may be linear, branched or cyclic. Illustrative examples include ethynyl, 1-propynyl, 2-propynyl, 1-n-butynyl, 2-n-butynyl, 3-n-butynyl, 1-methyl-2-propynyl, 1-n-pentynyl, 2-n-pentynyl, 3-n-pentynyl, 4-n-pentynyl, 1-methyl-2-n-butynyl, 1-methyl-3-n-butynyl, 2-methyl-3-n-butynyl, 3-methyl-1-n-butynyl, 1,1-dimethyl-2-propynyl, 2-ethyl-2-propynyl, 1-n-hexynyl, 2-n-hexynyl, 3-n-hexynyl, 4-n-hexynyl, 5-n-hexynyl, 1-methyl-2-pentynyl, 1-methyl-3-n-pentynyl, 1-methyl-4-n-pentynyl, 2-methyl-3-n-pentynyl, 2-methyl-4-n-pentynyl, 3-methyl-1-n-pentynyl, 3-methyl-4-n-pentynyl, 4-methyl-1-n-pentynyl, 4-methyl-2-n-pentynyl, 1,1-dimethyl-2-n-butynyl, 1,1-dimethyl-3-n-butynyl, 1,2-dimethyl-3-n-butynyl, 2,2-dimethyl-3-n-butynyl, 3,3-dimethyl-1-butynyl, 1-ethyl-2-butynyl, 1-ethyl-3-butynyl, 1-n-propyl-2-propynyl, 2-ethyl-3-n-butynyl, 1-methyl-1-ethyl-2-propynyl and 1-i-propyl-2-propynyl groups.

Illustrative examples of the aryl group include phenyl, α-naphthyl, β-naphthyl, o-biphenyl, m-biphenyl, p-biphenyl, 1-anthryl, 2-anthryl, 9-anthryl, 1-phenanthryl, 2-phenanthryl, 3-phenanthryl-4-phenanthryl and 9-phenanthryl groups.

Illustrative examples of the heteroaryl group include 2-furyl, 3-furyl, 2-thienyl, 3-thienyl, 1-pyrrolyl, 2-pyrrolyl, 3-pyrrolyl, 1-imidazolyl, 2-imidazolyl and 4-imidazolyl groups.

The alkoxy group may be linear, branched or cyclic. Illustrative examples include methoxy, ethoxy, n-propoxy, i-propoxy, c-propoxy, n-butoxy, i-butoxy, s-butoxy, t-butoxy, c-butoxy, n-pentyloxy, 1-methyl-n-butoxy, 2-methyl-n-butoxy, 3-methyl-n-butoxy, 1,1-dimethyl-n-propoxy, c-pentyloxy, 2-methyl-c-butoxy, n-hexyloxy, 1-methyl-n-pentyloxy, 2-methyl-n-pentyloxy, 1,1-dimethyl-n-butoxy, 1-ethyl-n-butoxy, 1,1,2-trimethyl-n-propoxy, c-hexyloxy, 1-methyl-c-pentyloxy, 1-ethyl-c-butoxy, 1,2-dimethyl-c-butoxy, n-heptyloxy, n-octyloxy, n-nonyloxy, n-decyloxy, n-undecyloxy and n-dodecyloxy groups.

The alkylthio group may be linear, branched or cyclic. Illustrative examples include methylthio, ethylthio, n-propylthio, i-propylthio, n-butylthio, s-butylthio, t-butylthio, n-pentylthio, 1-methylbutylthio, 2-methyl-n-butylthio, 3-methyl-n-butylthio, 1,1-dimethylpropylthio, 2,2-dimethylpropylthio, n-hexylthio, 1-methyl-n-pentylthio, 2-methyl-n-pentylthio, 1,1-dimethyl-n-butylthio, 1-ethyl-n-butylthio, 1,1,2-trimethylpropylthio, n-heptylthio, n-octylthio, 2-ethyl-n-hexylthio, n-nonylthio, n-decylthio, n-undecylthio and n-dodecylthio groups.

The monoalkylamino group may be linear, branched or cyclic. Illustrative examples include methylamino, ethylamino, n-propylamino, i-propylamino, c-propylamino, n-butylamino, i-butylamino, s-butylamino, t-butylamino, c-butylamino, 1-methyl-c-propylamino, 2-methyl-c-propylamino, n-pentylamino, 1-methyl-n-butylamino, 2-methyl-n-butylamino, 3-methyl-n-butylamino, 1,1-dimethyl-n-propylamino, 1,2-dimethyl-n-propylamino, 2,2-dimethyl-n-propylamino, 1-ethyl-n-propylamino, c-pentylamino, 1-methyl-c-butylamino, 2-methyl-c-butylamino, 3-methyl-c-butylamino, 1,2-dimethyl-c-propylamino, 2,3-dimethyl-c-propylamino, 1-ethyl-c-propylamino, 2-ethyl-c-propylamino, n-hexylamino, 1-methyl-n-pentylamino, 2-methyl-n-pentylamino, 3-methyl-n-pentylamino, 4-methyl-n-pentylamino, 1,1-dimethyl-n-butylamino, 1,2-dimethyl-n-butylamino, 1,3-dimethyl-n-butylamino, 2,2-dimethyl-n-butylamino, 2,3-dimethyl-n-butylamino, 3,3-dimethyl-n-butylamino, 1-ethyl-n-butylamino, 2-ethyl-n-butylamino, 1,1,2-trimethyl-n-propylamino, 1,2,2-trimethyl-n-propylamino, 1-ethyl-1-methyl-n-propylamino, 1-ethyl-2-methyl-n-propylamino, c-hexylamino, 1-methyl-c-pentylamino, 2-methyl-c-pentylamino, 3-methyl-c-pentylamino, 1-ethyl-c-butylamino, 2-ethyl-c-butylamino, 3-ethyl-c-butylamino, 1,2-dimethyl-c-butylamino, 1,3-dimethyl-c-butylamino, 2,2-dimethyl-c-butylamino, 2,3-dimethyl-c-butylamino, 2,4-dimethyl-c-butylamino, 3,3-dimethyl-c-butylamino, 1-n-propyl-c-propylamino, 2-n-propyl-c-propylamino, 1-i-propyl-c-propylamino, 2-i-propyl-c-propylamino, 1,2,2-trimethyl-c-propylamino, 1,2,3-trimethyl-c-propylamino, 2,2,3-trimethyl-c-propylamino, 1-ethyl-2-methyl-c-propylamino, 2-ethyl-1-methyl-c-propylamino, 2-ethyl-2-methyl-c-propylamino and 2-ethyl-3-methyl-c-propylamino groups.

The dialkylamino group may be linear, branched or cyclic. Illustrative examples include dimethylamino, diethylamino, di-n-propylamino, di-i-propylamino, di-c-propylamino, di-n-butylamino, di-i-butylamino, di-s-butylamino, di-t-butylamino, di-c-butylamino, di(1-methyl-c-propyl)amino, di(2-methyl-c-propyl)amino, di-n-pentylamino, di(1-methyl-n-butyl)amino, di(2-methyl-n-butyl)amino, di(3-methyl-n-butyl)amino, di(1,1-dimethyl-n-propyl)amino, di(1,2-dimethyl-n-propyl)amino, di(2,2-dimethyl-n-propyl)amino, di(1-ethyl-n-propyl)amino, di-c-pentylamino, di(1-methyl-c-butyl)amino, di(2-methyl-c-butyl)amino, di(3-methyl-c-butyl)amino, di(1,2-dimethyl-c-propyl)amino, di(2,3-dimethyl-c-propyl)amino, di(1-ethyl-c-propyl)amino, di(2-ethyl-c-propyl)amino, di-n-hexylamino, di(1-methyl-n-pentyl)amino, di(2-methyl-n-pentyl)amino, di(3-methyl-n-pentyl)amino, di(4-methyl-n-pentyl)amino, di(1,1-dimethyl-n-butyl)amino, di(1,2-dimethyl-n-butyl)amino, di(1,3-dimethyl-n-butyl)amino, di(2,2-dimethyl-n-butyl)amino, di(2,3-dimethyl-n-butyl)amino, di(3,3-dimethyl-n-butyl)amino, di(1-ethyl-n-butyl)amino, di(2-ethyl-n-butyl)amino, di(1,1,2-trimethyl-n-propyl)amino, di(1,2,2-trimethyl-n-propyl)amino, di(1-ethyl-1-methyl-n-propyl)amino, di(1-ethyl-2-methyl-n-propyl)amino, di-c-hexylamino, di(1-methyl-c-pentyl)amino, di(2-methyl-c-pentyl)amino, di(3-methyl-c-pentyl)amino, di(1-ethyl-c-butyl)amino, di(2-ethyl-c-butyl)amino, di(3-ethyl-c-butyl)amino, di(1,2-dimethyl-c-butyl)amino, di(1,3-dimethyl-c-butyl)amino, di(2,2-dimethyl-c-butyl)amino, di(2,3-dimethyl-c-butyl)amino, di(2,4-dimethyl-c-butyl)amino, di(3,3-dimethyl-c-butyl)amino, di(1-n-propyl-c-propyl)amino, di(2-n-propyl-c-propyl)amino, di(1-i-propyl-c-propyl)amino, di(2-i-propyl-c-propyl)amino, di(1,2,2-trimethyl-c-propyl)amino, di(1,2,3-trimethyl-c-propyl)amino, di(2,2,3-trimethyl-c-propyl)amino, di(1-ethyl-2-methyl-c-propyl)amino, di(2-ethyl-1-methyl-c-propyl)amino, di(2-ethyl-2-methyl-c-propyl)amino and di(2-ethyl-3-methyl-c-propyl)amino groups.

Illustrative examples of the alkylcarbonyl group include methylcarbonyl, ethylcarbonyl, n-propylcarbonyl, i-propylcarbonyl, c-propylcarbonyl, n-butylcarbonyl, i-butylcarbonyl, s-butylcarbonyl, t-butylcarbonyl, c-butylcarbonyl, 1-methyl-c-propylcarbonyl, 2-methyl-c-propylcarbonyl, n-pentylcarbonyl, 1-methyl-n-butylcarbonyl, 2-methyl-n-butylcarbonyl, 3-methyl-n-butylcarbonyl, 1,1-dimethyl-n-propylcarbonyl, 1,2-dimethyl-n-propylcarbonyl, 2,2-dimethyl-n-propylcarbonyl, 1-ethyl-n-propylcarbonyl, c-pentylcarbonyl, 1-methyl-c-butylcarbonyl, 2-methyl-c-butylcarbonyl, 3-methyl-c-butylcarbonyl, 1,2-dimethyl-c-propylcarbonyl, 2,3-dimethyl-c-propylcarbonyl, 1-ethyl-c-propylcarbonyl, 2-ethyl-c-propylcarbonyl, n-hexylcarbonyl, 1-methyl-n-pentylcarbonyl, 2-methyl-n-pentylcarbonyl, 3-methyl-n-pentylcarbonyl, 4-methyl-n-pentylcarbonyl, 1,1-dimethyl-n-butylcarbonyl, 1,2-dimethyl-n-butylcarbonyl, 1,3-dimethyl-n-butylcarbonyl, 2,2-dimethyl-n-butylcarbonyl, 2,3-dimethyl-n-butylcarbonyl, 3,3-dimethyl-n-butylcarbonyl, 1-ethyl-n-butylcarbonyl, 2-ethyl-n-butylcarbonyl, 1,1,2-trimethyl-n-propylcarbonyl, 1,2,2-trimethyl-n-propylcarbonyl, 1-ethyl-1-methyl-n-propylcarbonyl, 1-ethyl-2-methyl-n-propylcarbonyl, c-hexylcarbonyl, 1-methyl-c-pentylcarbonyl, 2-methyl-c-pentylcarbonyl, 3-methyl-c-pentylcarbonyl, 1-ethyl-c-butylcarbonyl, 2-ethyl-c-butylcarbonyl, 3-ethyl-c-butylcarbonyl, 1,2-dimethyl-c-butylcarbonyl, 1,3-dimethyl-c-butylcarbonyl, 2,2-dimethyl-c-butylcarbonyl, 2,3-dimethyl-c-butylcarbonyl, 2,4-dimethyl-c-butylcarbonyl, 3,3-dimethyl-c-butylcarbonyl, 1-n-propyl-c-propylcarbonyl, 2-n-propyl-c-propylcarbonyl, 1-i-propyl-c-propylcarbonyl, 2-i-propyl-c-propylcarbonyl, 1,2,2-trimethyl-c-propylcarbonyl, 1,2,3-trimethyl-c-propylcarbonyl, 2,2,3-trimethyl-c-propylcarbonyl, 1-ethyl-2-methyl-c-propylcarbonyl, 2-ethyl-1-methyl-c-propylcarbonyl, 2-ethyl-2-methyl-c-propylcarbonyl and 2-ethyl-3-methyl-c-propylcarbonyl groups.

Of these, to increase the capacity and electrical conductivity, $R^1$ to $R^{17}$ are preferably each independently a hydrogen atom, chlorine atom, methyl group, ethyl group, n-propyl group, i-propyl group, n-butyl group, s-butyl group, t-butyl group, n-pentyl group, 1-methylbutyl group, 2-methylbutyl group, 3-methylbutyl group, 1,1-dimethylpropyl group, 2,2-dimethylpropyl group, n-hexyl group, 1-methylpentyl group, 2-methylpentyl group, 1,1-dimethylbutyl group, 1-ethylbutyl group or 1,1,2-trimethylpropyl group; more preferably a hydrogen atom, chlorine atom, methyl group, ethyl group, n-propyl group, i-propyl group, n-butyl group, s-butyl group or t-butyl group; and most preferably a hydrogen atom.

Some or all of the hydrogen atoms that bond to the carbon atoms in the above groups may be substituted with substituents. Such substituents are exemplified by halogen atoms such as fluorine, chlorine, bromine and iodine atoms, hydroxyl groups, mercapto groups, amino groups, alkoxy groups of 1 to 11 carbon atoms, haloalkoxy groups of 1 to 11 carbon atoms, alkylthio groups of 1 to 11 carbon atoms, monoalkylamino groups of 1 to 11 carbons, dialkylamino groups in which each alkyl group is independently an alkyl group of 1 to 11 carbons, glycidoxy groups, alkylcarbonyl groups of 2 to 11 carbon atoms, alkenylcarbonyl groups of 3 to 11 carbon atoms, alkynylcarbonyl groups of 3 to 11 carbon atoms, alkylcarbonyloxy groups of 2 to 11 carbon atoms, alkenylcarbonyloxy groups of 3 to 11 carbon atoms, alkynylcarbonyloxy groups of 3 to 11 carbon atoms, aryl groups of 6 to 11 carbon atoms, halogenated aryl groups of 6 to 11 carbon atoms, heteroaryl groups of 3 to 11 carbon atoms, and halogenated heteroaryl groups of 3 to 11 carbon atoms. When such substituents are present, the upper limit in the total number of carbon atoms in each of $R^1$ to $R^{17}$ is 12.

Illustrative examples of the alkoxy group of 1 to 11 carbon atoms include methoxy, ethoxy, n-propoxy, i-propoxy, c-propoxy, n-butoxy, i-butoxy, s-butoxy, t-butoxy, c-butoxy, 1-methyl-c-propoxy, 2-methyl-c-propoxy, n-pentyloxy, 1-methyl-n-butoxy, 2-methyl-n-butoxy, 3-methyl-n-butoxy, 1,1-dimethyl-n-propoxy, 1,2-dimethyl-n-propoxy, 2,2-dimethyl-n-propoxy, 1-ethyl-n-propoxy, c-pentyloxy, 1-methyl-c-butoxy, 2-methyl-c-butoxy, 3-methyl-c-butoxy, 1,2-dimethyl-c-propoxy, 2,3-dimethyl-c-propoxy, 1-ethyl-c-propoxy, 2-ethyl-c-propoxy, n-hexyloxy, 1-methyl-n-pentyloxy, 2-methyl-n-pentyloxy, 3-methyl-n-pentyloxy, 4-methyl-n-pentyloxy, 1,1-dimethyl-n-butoxy, 1,2-dimethyl-n-butoxy, 1,3-dimethyl-n-butoxy, 2,2-dimethyl-n-butoxy, 2,3-dimethyl-n-butoxy, 3,3-dimethyl-n-butoxy, 1-ethyl-n-butoxy, 2-ethyl-n-butoxy, 1,1,2-trimethyl-n-propoxy, 1,2,2-trimethyl-n-propoxy, 1-ethyl-1-methyl-n-propoxy, 1-ethyl-2-methyl-n-propoxy, c-hexyloxy, 1-methyl-c-pentyloxy, 2-methyl-c-pentyloxy, 3-methyl-c-pentyloxy, 1-ethyl-c-butoxy, 2-ethyl-c-butoxy, 3-ethyl-c-butoxy, 1,2-dimethyl-c-butoxy, 1,3-dimethyl-c-butoxy, 2,2-dimethyl-c-butoxy, 2,3-dimethyl-c-butoxy, 2,4-dimethyl-c-butoxy, 3,3-dimethyl-c-butoxy, 1-n-propyl-c-propoxy, 2-n-propyl-c-propoxy, 1-i-propyl-c-propoxy, 2-i-propyl-c-propoxy, 1,2,2-trimethyl-c-propoxy, 1,2,3-trimethyl-c-propoxy, 2,2,3-trimethyl-c-propoxy, 1-ethyl-2-methyl-c-propoxy, 2-ethyl-1-methyl-c-propoxy, 2-ethyl-2-methyl-c-propoxy, 2-ethyl-3-methyl-c-propoxy, n-heptyloxy, n-octyloxy, n-nonyloxy, n-decyloxy and n-undecyloxy groups.

Illustrative examples of the haloalkoxy group of 1 to 11 carbons include difluoromethoxy, trifluoromethoxy, bromodifluoromethoxy, 2-chloroethoxy, 2-bromoethoxy, 1,1-difluoroethoxy, 2,2,2-trifluoroethoxy, 1,1,2,2-tetrafluoroethoxy, 2-chloro-1,1,2-trifluoroethoxy, pentafluoroethoxy, 3-bromopropoxy, 2,2,3,3-tetrafluoropropoxy, 1,1,2,3,3,3-hexafluoropropoxy, 1,1,1,3,3,3-hexafluoropropan-2-yloxy, 3-bromo-2-methylpropoxy, 4-bromobutoxy and perfluoropentyloxy groups.

Illustrative examples of the alkylthio group of 1 to 11 carbon atoms include methylthio, ethylthio, n-propylthio, i-propylthio, c-propylthio, n-butylthio, i-butylthio, s-butylthio, t-butylthio, c-butylthio, 1-methyl-c-propylthio, 2-methyl-c-propylthio, n-pentylthio, 1-methyl-n-butylthio, 2-methyl-n-butylthio, 3-methyl-n-butylthio, 1,1-dimethyl-n-propylthio, 1,2-dimethyl-n-propylthio, 2,2-dimethyl-n-propylthio, 1-ethyl-n-propylthio, c-pentylthio, 1-methyl-c-butylthio, 2-methyl-c-butylthio, 3-methyl-c-butylthio, 1,2-dimethyl-c-propylthio, 2,3-dimethyl-c-propylthio, 1-ethyl-c-propylthio, 2-ethyl-c-propylthio, n-hexylthio, 1-methyl-n-pentylthio, 2-methyl-n-pentylthio, 3-methyl-n-pentylthio, 4-methyl-n-pentylthio, 1,1-dimethyl-n-butylthio, 1,2-dimethyl-n-butylthio, 1,3-dimethyl-n-butylthio, 2,2-dimethyl-n-butylthio, 2,3-dimethyl-n-butylthio, 3,3-dimethyl-n-butylthio, 1-ethyl-n-butylthio, 2-ethyl-n-butylthio, 1,1,2-trimethyl-n-propylthio, 1,2,2-trimethyl-n-propylthio, 1-ethyl-1-methyl-n-propylthio, 1-ethyl-2-methyl-n-propylthio, c-hexylthio, 1-methyl-c-pentylthio, 2-methyl-c-pentylthio, 3-methyl-c-pentylthio, 1-ethyl-c-butylthio, 2-ethyl-c-butylthio, 3-ethyl-c-butylthio, 1,2-dimethyl-c-butylthio, 1,3-dimethyl-c-butylthio, 2,2-dimethyl-c-butylthio, 2,3-dimethyl-c-butylthio, 2,4-dimethyl-c-butylthio, 3,3-dimethyl-c-butylthio, 1-n-propyl-c-propylthio, 2-n-propyl-c-propylthio, 1-i-propyl-c-propylthio, 2-i-propyl-c-propylthio, 1,2,2-trimethyl-c-propylthio, 1,2,3-trimethyl-c-propylthio, 2,2,3-trimethyl-c-propylthio, 1-ethyl-2-methylc-propylthio, 2-ethyl-1-methyl-c-propylthio, 2-ethyl-2-methyl-c-propylthio, 2-ethyl-3-methyl-c-propylthio, n-heptylthio, n-octylthio, n-nonylthio, n-decylthio and n-undecylthio groups.

Illustrative examples of the monoalkylamino group of 1 to 11 carbon atoms include methylamino, ethylamino, n-propylamino, i-propylamino, c-propylamino, n-butylamino, i-butylamino, s-butylamino, t-butylamino, c-butylamino, 1-methyl-c-propylamino, 2-methyl-c-propylamino, n-pentylamino, 1-methyl-n-butylamino, 2-methyl-n-butylamino, 3-methyl-n-butylamino, 1,1-dimethyl-n-propylamino, 1,2-dimethyl-n-propylamino, 2,2-dimethyl-n-propylamino, 1-ethyl-n-propylamino, c-pentylamino, 1-methyl-c-butylamino, 2-methyl-c-butylamino, 3-methyl-c-butylamino, 1,2-dimethyl-c-propylamino, 2,3-dimethyl-c-propylamino, 1-ethyl-c-propylamino, 2-ethyl-c-propylamino, n-hexylamino, 1-methyl-n-pentylamino, 2-methyl-n-pentylamino, 3-methyl-n-pentylamino, 4-methyl-n-pentylamino, 1,1-dimethyl-n-butylamino, 1,2-dimethyl-n-butylamino, 1,3-dimethyl-n-butylamino, 2,2-dimethyl-n-butylamino, 2,3-dimethyl-n-butylamino, 3,3-dimethyl-n-butylamino, 1-ethyl-n-butylamino, 2-ethyl-n-butylamino, 1,1,2-trimethyl-n-propylamino, 1,2,2-trimethyl-n-propylamino, 1-ethyl-1-methyl-n-propylamino, 1-ethyl-2-methyl-n-propylamino, c-hexylamino, 1-methyl-c-pentylamino, 2-methyl-c-pentylamino, 3-methyl-c-pentylamino, 1-ethyl-c-butylamino, 2-ethyl-c-butylamino, 3-ethyl-c-butylamino, 1,2-dimethyl-c-butylamino, 1,3-dimethyl-c-butylamino, 2,2-dimethyl-c-butylamino, 2,3-dimethyl-c-butylamino, 2,4-dimethyl-c-butylamino, 3,3-dimethyl-c-butylamino, 1-n-propyl-c-propylamino, 2-n-propyl-c-propylamino, 1-i-propyl-c-propylamino, 2-i-propyl-c-propylamino, 1,2,2-trimethyl-c-propylamino, 1,2,3-trimethyl-c-propylamino, 2,2,3-trimethyl-c-propylamino, 1-ethyl-2-methyl-c-propylamino, 2-ethyl-1-methyl-c-propylamino, 2-ethyl-2-methyl-c-propylamino and 2-ethyl-3-methyl-c-propylamino groups.

Illustrative examples of the dialkylamino group in which each alkyl group is independently an alkyl group of 1 to 11 carbons include dimethylamino, diethylamino, di-n-propylamino, di-i-propylamino, di-c-propylamino, di-n-butylamino, di-i-butylamino, di-s-butylamino, di-t-butylamino, di-c-butylamino, di(1-methyl-c-propyl)amino, di(2-methyl-c-propyl)amino, di-n-pentylamino, di(1-methyl-n-butyl)amino, di(2-methyl-n-butyl)amino, di(3-methyl-n-butyl)amino, di(1,1-dimethyl-n-propyl)amino, di(1,2-dimethyl-n-propyl)amino, di(2,2-dimethyl-n-propyl)amino, di(1-ethyl-n-propyl)amino, di-c-pentylamino, di(1-methyl-c-butyl)amino, di(2-methyl-c-butyl)amino, di(3-methyl-c-butyl)amino, di(1,2-dimethyl-c-propyl)amino, di(2,3-dimethyl-c-propyl)amino, di(1-ethyl-c-propyl)amino, di(2-ethyl-c-propyl)amino, di-n-hexylamino, di(1-methyl-n-pentyl)amino, di(2-methyl-n-pentyl)amino, di(3-methyl-n-pentyl)amino, di(4-methyl-n-pentyl)amino, di(1,1-dimethyl-n-butyl)amino, di(1,2-dimethyl-n-butyl)amino, di(1,3-dimethyl-n-butyl)amino, di(2,2-dimethyl-n-butyl)amino, di(2,3-dimethyl-n-butyl)amino, di(3,3-dimethyl-n-butyl)amino, di(1-ethyl-n-butyl)amino, di(2-ethyl-n-butyl)amino, di(1,1,2-trimethyl-n-propyl)amino, di(1,2,2-trimethyl-n-propyl)amino, di(1-ethyl-1-methyl-n-propyl)amino, di(1-ethyl-2-methyl-n-propyl)amino, di-c-hexylamino, di(1-methyl-c-pentyl)amino, di(2-methyl-c-pentyl)amino, di(3-methyl-c-pentyl)amino, di(1-ethyl-c-butyl)amino, di(2-ethyl-c-butyl)amino, di-(3-ethyl-c-butyl)amino, di(1,2-dimethyl-c-butyl)amino, di(1,3-dimethyl-c-butyl)amino, di(2,2-dimethyl-c-butyl)amino, di(2,3-dimethyl-c-butyl) amino, di(2,4-dimethyl-c-butyl)amino, di(3,3-dimethyl-c-butyl)amino, di(1-n-propyl-c-propyl)amino, di(2-n-propyl-c-propyl)amino, di(1-i-propyl-c-propyl)amino, di(2-i-propyl-c-propyl)amino, di(1,2,2-trimethyl-c-propyl)amino, di(1,2,3-trimethyl-c-propyl)amino, di(2,2,3-trimethyl-c-propyl)amino, di(1-ethyl-2-methyl-c-propyl)amino, di(2-ethyl-1-methyl-c-propyl)amino, di(2-ethyl-2-methyl-c-propyl)amino and di(2-ethyl-3-methyl-c-propyl)amino groups.

Illustrative examples of the alkylcarbonyl group of 2 to 11 carbon atoms include methylcarbonyl, ethylcarbonyl, n-propylcarbonyl, i-propylcarbonyl, c-propylcarbonyl, n-butylcarbonyl, i-butylcarbonyl, s-butylcarbonyl, t-butylcarbonyl, c-butylcarbonyl, 1-methyl-c-propylcarbonyl, 2-methyl-c-propylcarbonyl, n-pentylcarbonyl, 1-methyl-n-butylcarbonyl, 2-methyl-n-butylcarbonyl, 3-methyl-n-butylcarbonyl, 1,1-dimethyl-n-propylcarbonyl, 1,2-dimethyl-n-propylcarbonyl, 2,2-dimethyl-n-propylcarbonyl, 1-ethyl-n-propylcarbonyl, c-pentylcarbonyl, 1-methyl-c-butylcarbonyl, 2-methyl-c-butylcarbonyl, 3-methyl-c-butylcarbonyl, 1,2-dimethyl-c-propylcarbonyl, 2,3-dimethyl-c-propylcarbonyl, 1-ethyl-c-propylcarbonyl, 2-ethyl-c-propylcarbonyl, n-hexylcarbonyl, 1-methyl-n-pentylcarbonyl, 2-methyl-n-pentylcarbonyl, 3-methyl-n-pentylcarbonyl, 4-methyl-n-pentylcarbonyl, 1,1-dimethyl-n-butylcarbonyl, 1,2-dimethyl-n-butylcarbonyl, 1,3-dimethyl-n-butylcarbonyl, 2,2-dimethyl-n-butylcarbonyl, 2,3-dimethyl-n-butylcarbonyl, 3,3-dimethyl-n-butylcarbonyl, 1-ethyl-n-butylcarbonyl, 2-ethyl-n-butylcarbonyl, 1,1,2-trimethyl-n-propylcarbonyl, 1,2,2-trimethyl-n-propylcarbonyl, 1-ethyl-1-methyl-n-propylcarbonyl, 1-ethyl-2-methyl-n-propylcarbonyl, c-hexylcarbonyl, 1-methyl-c-pentylcarbonyl, 2-methyl-c-pentylcarbonyl, 3-methyl-c-pentylcarbonyl, 1-ethyl-c-butylcarbonyl, 2-ethyl-c-butylcarbonyl, 3-ethyl-c-butylcarbonyl, 1,2-dimethyl-c-butylcarbonyl, 1,3-dimethyl-c-butylcarbonyl, 2,2-dimethyl-c-butylcarbonyl, 2,3-dimethyl-c-butylcarbonyl, 2,4-dimethyl-c-butylcarbonyl, 2,3-dimethyl-c-butylcarbonyl, 2,4-dimethyl-c-butylcarbonyl, 3,3-dimethyl-c-butylcarbonyl, 1-n-propyl-c-propylcarbonyl, 2-n-propyl-c-propylcarbonyl, 1-i-propyl-c-propylcarbonyl, 2-i-propyl-c-propylcarbonyl, 1,2,2-trimethyl-c-propylcarbonyl, 1,2,3-trimethyl-c-propylcarbonyl, 2,2,3-trimethyl-c-propylcarbonyl, 1-ethyl-2-methyl-c-propylcarbonyl, 2-ethyl-1-methyl-c-propylcarbonyl, 2-ethyl-2-methyl-c-propylcarbonyl and 2-ethyl-3-methyl-c-propylcarbonyl.

Illustrative examples of the alkenylcarbonyl group of 3 to 11 carbons include ethenylcarbonyl, 1-propenylcarbonyl, 2-propenylcarbonyl, 1-methyl-1-ethenylcarbonyl, 1-butenylcarbonyl, 2-butenylcarbonyl, 3-butenylcarbonyl, 2-methyl-1-propenylcarbonyl, 2-methyl-2-propenylcarbonyl, 1-ethylethenylcarbonyl, 1-methyl-1-propenylcarbonyl, 1-methyl-2-propenylcarbonyl, 1-pentenylcarbonyl, 2-pentenylcarbonyl, 3-pentenylcarbonyl, 4-pentenylcarbonyl, 1-n-propylethenylcarbonyl, 1-methyl-1-butenylcarbonyl, 1-methyl-2-butenylcarbonyl, 1-methyl-3-butenylcarbonyl, 2-ethyl-2-propenylcarbonyl, 2-methyl-1-butenylcarbonyl, 2-methyl-2-butenylcarbonyl, 2-methyl-3-butenylcarbonyl, 3-methyl-1-butenylcarbonyl, 2-methyl-3-butenylcarbonyl, 3-methyl-1-butenylcarbonyl, 3-methyl-2-butenylcarbonyl, 3-methyl-3-butenylcarbonyl, 1,1-dimethyl-2-propenylcarbonyl, 1-i-propylethenylcarbonyl, 1,2-dimethyl-1-propenylcarbonyl, 1,2-dimethyl-2-propenylcarbonyl, 1-c-pentenylcarbonyl, 2-c-pentenylcarbonyl, 3-c-pentenylcarbonyl, 1-hexenylcarbonyl, 2-hexenylcarbonyl, 3-hexenylcarbonyl, 4-hexenylcarbonyl, 5-hexenylcarbonyl, 1-methyl-1-pentenylcarbonyl, 1-methyl-2-pentenylcarbonyl, 1-methyl-3-pentenylcarbonyl, 1-methyl-4-pentenylcarbonyl, 1-n-butylethenylcarbonyl, 2-methyl-1-pentenylcarbonyl, 2-methyl-2-pentenylcarbonyl, 2-methyl-3-pentenylcarbonyl, 2-methyl-4-pentenylcarbonyl, 2-n-propyl-2-propenylcarbonyl, 3-methyl-1-pentenylcarbonyl, 3-methyl-2-pentenylcarbonyl, 3-methyl-3-pentenylcarbonyl, 3-methyl-4-pentenylcarbonyl, 3-ethyl-3-butenylcarbonyl, 4-methyl-1-pentenylcarbonyl, 4-methyl-2-pentenylcarbonyl, 4-methyl-3-pentenylcarbonyl, 4-methyl-4-pentenylcarbonyl, 1,1-dimethyl-2-butenylcarbonyl, 1,1-dimethyl-3-butenylcarbonyl, 1,2-dimethyl-1-butenylcarbonyl, 1,2-dimethyl-2-butenylcarbonyl, 1,2-dimethyl-3-butenylcarbonyl, 1-methyl-2-ethyl-2-propenylcarbonyl, 1-s-butylethenylcarbonyl, 1,3-dimethyl-1-butenylcarbonyl, 1,3-dimethyl-2-butenylcarbonyl, 1,3-dimethyl-3-butenylcarbonyl, 1-i-butylethenylcarbonyl, 2,2-dimethyl-3-butenylcarbonyl, 2,3-dimethyl-1-butenylcarbonyl, 2,3-dimethyl-2-butenylcarbonyl, 2,3-dimethyl-3-butenylcarbonyl, 2-i-propyl-2-propenylcarbonyl, 3,3-dimethyl-1-butenylcarbonyl, 1-ethyl-1-butenylcarbonyl, 1-ethyl-2-butenylcarbonyl, 1-ethyl-3-butenylcarbonyl, 1-n-propyl-1-propenylcarbonyl, 1-n-propyl-2-propenylcarbonyl, 2-ethyl-1-butenylcarbonyl, 2-ethyl-2-butenylcarbonyl, 2-ethyl-3-butenylcarbonyl, 1,1,2-trimethyl-2-propenylcarbonyl, 1-t-butylethenylcarbonyl, 1-methyl-1-ethyl-2-propenylcarbonyl, 1-ethyl-2-methyl-1-propenylcarbonyl, 1-ethyl-2-methyl-2-propenylcarbonyl, 1-i-propyl-1-propenylcarbonyl, 1-i-propyl-2-propenylcarbonyl, 1-methyl-2-c-pentenylcarbonyl, 1-methyl-3-c-pentenylcarbonyl, 2-methyl-1-c-pentenylcarbonyl, 2-methyl-2-c-pentenylcarbonyl, 2-methyl-3-c-pentenylcarbonyl, 2-methyl-4-c-pentenylcarbonyl, 2-methyl-5-c-pentenylcarbonyl, 2-methylene-c-pentylcarbonyl, 3-methyl-1-c-pentenylcarbonyl, 3-methyl-2-c-pentenylcarbonyl, 3-methyl-3-c-pentenylcarbonyl, 3-methyl-4-c-pentenylcarbonyl, 3-methyl-5-c-pentenylcarbonyl, 3-methylene-c-pentylcarbonyl 1-c-hexenylcarbonyl, 2-c-hexenylcarbonyl and 3-c-hexenylcarbonyl groups.

Illustrative examples of the alkynylcarbonyl group of 3 to 11 carbon atoms include ethynylcarbonyl, 1-propynylcarbonyl, 2-propynylcarbonyl, 1-butynylcarbonyl, 2-butynylcarbonyl, 3-butynylcarbonyl, 1-methyl-2-propynylcarbonyl, 1-pentynylcarbonyl, 2-pentynylcarbonyl, 3-pentynylcarbonyl, 4-pentynylcarbonyl, 1-methyl-2-butynylcarbonyl, 1-methyl-3-butynylcarbonyl, 2-methyl-3-butynylcarbonyl, 3-methyl-1-butynylcarbonyl, 1,1-dimethyl-2-propynylcarbonyl, 2-ethyl-2-propynylcarbonyl, 1-hexynylcarbonyl, 2-hexynylcarbonyl, 3-hexynylcarbonyl, 4-hexynylcarbonyl, 5-hexynylcarbonyl, 1-methyl-2-pentynylcarbonyl, 1-methyl-3-pentynylcarbonyl, 1-methyl-4-pentynylcarbonyl, 2-methyl-3-pentynylcarbonyl, 2-methyl-4-pentynylcarbonyl, 3-methyl-1-pentynylcarbonyl, 3-methyl-4-pentynylcarbonyl, 4-methyl-1-pentynylcarbonyl, 4-methyl-2-pentynylcarbonyl, 1,1-dimethyl-2-butynylcarbonyl, 1,1-dimethyl-3-butynylcarbonyl, 1,2-dimethyl-3-butynylcarbonyl, 2,2-dimethyl-3-butynylcarbonyl, 3,3-dimethyl-1-butynylcarbonyl, 1-ethyl-2-butynylcarbonyl, 1-ethyl-3-butynylcarbonyl, 1-n-propyl-2-propynylcarbonyl, 2-ethyl-3-butynylcarbonyl, 1-methyl-1-ethyl-2-propynyl and 1-i-propyl-2-propynylcarbonyl groups.

Illustrative examples of the alkylcarbonyloxy group of 2 to 11 carbon atoms include methylcarbonyloxy, ethylcarbonyloxy, n-propylcarbonyloxy, i-propylcarbonyloxy, c-propylcarbonyloxy, n-butylcarbonyloxy, i-butylcarbonyloxy, s-butylcarbonyloxy, t-butylcarbonyloxy, c-butylcarbonyloxy, 1-methyl-c-propylcarbonyloxy, 2-methyl-c-propylcarbonyloxy, n-pentylcarbonyloxy, 1-methyl-n-butylcarbonyloxy, 2-methyl-n-butylcarbonyloxy, 3-methyl-n-butylcarbonyloxy, 1,1-dimethyl-n-propylcarbonyloxy, 1,2-dimethyl-n-propylcarbonyloxy, 2,2-dimethyl-n-propylcarbonyloxy, 1-ethyl-n-propylcarbonyloxy, c-pentylcarbonyloxy, 1-methyl-c-butylcarbonyloxy, 2-methyl-c-butylcarbonyloxy, 3-methyl-c-butylcarbonyloxy, 1,2-dimethyl-c-propylcarbonyloxy, 2,3-dimethyl-c-propylcarbonyloxy, 1-ethyl-c-propylcarbonyloxy, 2-ethyl-c-propylcarbonyloxy, n-hexylcarbonyloxy, 1-methyl-n-pentylcarbonyloxy, 2-methyl-n-pentylcarbonyloxy, 3-methyl-n-pentylcarbonyloxy, 4-methyl-n-pentylcarbonyloxy, 1,1-dimethyl-n-butylcarbonyloxy, 1,2-dimethyl-n-butylcarbonyloxy, 1,3-dimethyl-n-butylcarbonyloxy, 2,2-dimethyl-n-butylcarbonyloxy, 2,3-dimethyl-n-butylcarbonyloxy, 3,3-dimethyl-n-butylcarbonyloxy, 1-ethyl-n-butylcarbonyloxy, 2-ethyl-n-butylcarbonyloxy, 1,1,2-trimethyl-n-propylcarbonyloxy, 1,2,2-trimethyl-n-propylcarbonyloxy, 1-ethyl-1-methyl-n-propylcarbonyloxy, 1-ethyl-2-methyl-n-propylcarbonyloxy, c-hexylcarbonyloxy, 1-methyl-c-pentylcarbonyloxy, 2-methyl-c-pentylcarbonyloxy, 3-methyl-c-pentylcarbonyloxy, 1-ethyl-c-butylcarbonyloxy, 2-ethyl-c-butylcarbonyloxy, 3-ethyl-c-butylcarbonyloxy, 1,2-dimethyl-c-butylcarbonyloxy, 1,3-dimethyl-c-butylcarbonyloxy, 2,2-dimethyl-c-butylcarbonyloxy, 2,3-dimethyl-c-butylcarbonyloxy, 2,4-dimethyl-c-butylcarbonyloxy, 3,3-dimethyl-c-butylcarbonyloxy, 1-n-propyl-c-propylcarbonyloxy, 2-n-propyl-c-propylcarbonyloxy, 1-i-propyl-c-propylcarbonyloxy, 2-i-propyl-c-propylcarbonyloxy, 1,2,2-trimethyl-c-propylcarbonyloxy, 1,2,3-trimethyl-c-propylcarboyloxy, 2,2,3-trimethyl-c-propylcarbonyloxy, 1-ethyl-2-methyl-c-propylcarbonyloxy, 2-ethyl-1-methyl-c-propylcarbonyloxy, 2-ethyl-2-methyl-c-propylcarbonyloxy and 2-ethyl-3-methyl-c-propylcarbonyloxy groups.

Illustrative examples of the alkenylcarbonyloxy group of 3 to 11 carbon atoms include ethenylcarbonyoxy, 1-propenylcarbonyloxy, 2-propenylcarbonyloxy, 1-methyl-1-ethenylcarbonyloxy, 1-butenylcarbonyloxy, 2-butenylcarbonyloxy, 3-butenylcarbonyloxy, 2-methyl-1-propenylcarbonyloxy, 2-methyl-2-propenylcarbonyloxy, 1-ethylethenylcarbonyloxy, 1-methyl-1-propenylcarbonyloxy, 1-methyl-2-propenylcarbonyloxy, 1-pentenylcarbonyloxy, 2-pentenylcarbonyloxy, 3-pentenylcarbonyloxy, 4-pentenylcarbonyloxy, 1-n-propylethenylcarbonyloxy, 1-methyl-1-butenylcarbonyloxy, 1-methyl-2-butenylcarbonyloxy, 1-methyl-3-butenylcarbonyloxy, 2-ethyl-2-propenylcarbonyloxy, 2-methyl-1-butenylcarbonyloxy, 2-methyl-2-butenylcarbonyloxy, 2-methyl-3-butenylcarbonyloxy, 3-methyl-1-butenylcarbonyloxy, 3-methyl-2-butenylcarbonyloxy, 3-methyl-3-butenylcarbonyloxy, 1,1-dimethyl-2-propenylcarbonyloxy, 1-i-propylethenylcarbonyloxy, 1,2-dimethyl-1-propenylcarbonyloxy, 1,2-dimethyl-2-propenylcarbonyloxy, 1-c-pentenylcarbonyloxy, 2-c-pentenylcarbonyloxy, 3-c-pentenylcarbonyloxy, 1-hexenylcarbonyloxy, 2-hexenylcarbonyloxy, 3-hexenylcarbonyloxy, 4-hexenylcarbonyloxy, 5-hexenylcarbonyloxy, 1-methyl-1-pentenylcarbonyloxy, 1-methyl-2-pentenylcarbonyloxy, 1-methyl-3-pentenylcarbonyloxy, 1-methyl-4-pentenylcarbonyloxy, 1-n-butylethenylcarbonyloxy, 2-methyl-1-pentenylcarbonyloxy, 2-methyl-2-pentenylcarbonyloxy, 2-methyl-3-pentenylcarbonyloxy, 2-methyl-4-pentenylcarbonyloxy, 2-n-propyl-2-propenylcarbonyloxy, 3-methyl-1-pentenylcarbonyloxy, 3-methyl-2-pentenylcarbonyloxy, 3-methyl-3-pentenylcarbonyloxy, 3-methyl-4-pentenylcarbonyloxy, 3-ethyl-3-butenylcarbonyloxy, 4-methyl-1-pentenylcarbonyloxy, 4-methyl-2-pentenylcarbonyloxy, 4-methyl-3-pentenylcarbonyloxy, 4-methyl-4-pentenylcarbonyloxy, 1,1-dimethyl-2-butenylcarbonyloxy, 1,1-dimethyl-3-butenylcarbonyloxy, 1,2-dimethyl-1-butenylcarbonyloxy, 1,2-dimethyl-2-butenylcarbonyloxy, 1,2-dimethyl-3-butenylcarbonyloxy, 1-methyl-2-ethyl-2-propenylcarbonyloxy, 1-s-butylethenylcarbonyloxy, 1,3-dimethyl-1-butenylcarbonyloxy, 1,3-dimethyl-2-butenylcarbonyloxy, 1,3-dimethyl-3-butenylcarbonyloxy, 1-i-butylethenylcarbonyloxy, 2,2-dimethyl-3-butenylcarbonyloxy, 2,3-dimethyl-1-butenylcarbonyloxy, 2,3-dimethyl-2-butenylcarbonyloxy, 2,3-dimethyl-3-butenylcarbonyloxy, 2-i-propyl-2-propenylcarbonyloxy, 3,3-dimethyl-1-butenylcarbonyloxy, 1-ethyl-1-butenylcarbonyloxy, 1-ethyl-2-butenylcarbonyloxy, 1-ethyl-3-butenylcarbonyloxy, 1-n-propyl-1-propenylcarbonyloxy, 1-n-propyl-2-propenylcarbonyloxy, 2-ethyl-1-butenylcarbonyloxy, 2-ethyl-2-butenylcarbonyloxy, 2-ethyl-3-butenylcarbonyloxy, 1,1,2-trimethyl-2-propenylcarbonyloxy, 1-t-butylethenylcarbonyloxy, 1-methyl-1-ethyl-2-propenylcarbonyloxy, 1-ethyl-2-methyl-1-propenylcarbonyloxy, 1-ethyl-2-methyl-2-propenylcarbonyloxy, 1-i-propyl-1-propenylcarbonyloxy, 1-i-propyl-2-propenylcarbonyloxy, 1-methyl-2-c-pentenylcarbonyloxy, 1-methyl-3-c-pentenylcarbonyloxy, 2-methyl-1-c-pentenylcarbonyloxy, 2-methyl-2-c-pentenylcarbonyloxy, 2-methyl-3-c-pentenylcarbonyloxy, 2-methyl-4-c-pentenylcarbonyloxy, 2-methyl-5-c-pentenylcarbonyloxy, 2-methylene-c-pentylcarbonyloxy, 3-methyl-1-c-pentenylcarbonyloxy, 3-methyl-2-c-pentenylcarbonyloxy, 3-methyl-3-c-pentenylcarbonyloxy, 3-methyl-4-c-pentenylcarbonyloxy, 3-methyl-5-c-pentenylcarbonyloxy, 3-methylene-c-pentylcarbonyloxy, 1-c-hexenylcarbonyloxy, 2-c-hexenylcarbonyloxy and 3-c-hexenylcarbonyloxy groups.

Illustrative examples of the alkynylcarbonyloxy group of 3 to 11 carbons include ethynylcarbonyloxy, 1-propynylcarbonyloxy, 2-propynylcarbonyloxy, 1-butynylcarbonyloxy, 2-butynylcarbonyloxy, 3-butynylcarbonyloxy, 1-methyl-2-propynylcarbonyloxy, 1-pentynylcarbonyloxy, 2-pentynylcarbonyloxy, 3-pentynylcarbonyloxy, 4-pentynylcarbonyloxy, 1-methyl-2-butynylcarbonyloxy, 1-methyl-3-butynylcarbonyloxy, 2-methyl-3-butynylcarbonyloxy, 3-methyl-1-butynylcarbonyloxy, 1,1-dimethyl-2-propynylcarbonyloxy, 2-ethyl-2-propynylcarbonyloxy, 1-hexynylcarbonyloxy, 2-hexynylcarbonyloxy, 3-hexynylcarbonyloxy, 4-hexynylcarbonyloxy, 5-hexynylcarbonyloxy, 1-methyl-2-pentynylcarbonyloxy, 1-methyl-3-pentynylcarbonyloxy, 1-methyl-4-pentynylcarbonyloxy, 2-methyl-3-pentynylcarbonyloxy, 2-methyl-4-pentynylcarbonyloxy, 3-methyl-1-pentynylcarbonyloxy, 3-methyl-4-pentynylcarbonyloxy, 4-methyl-1-pentynylcarbonyloxy, 4-methyl-2-pentynylcarbonyloxy, 1,1-dimethyl-2-butynylcarbonyloxy, 1,1-dimethyl-3-butynylcarbonyloxy, 1,2-dimethyl-3-butynylcarbonyloxy, 2,2-dimethyl-3-butynylcarbonyloxy, 3,3-dimethyl-1-butynylcarbonyloxy, 1-ethyl-2-butynylcarbonyloxy, 1-ethyl-3-butynylcarbonyloxy, 1-n-propyl-2-propynylcarbonyloxy, 2-ethyl-3-butynylcarbonyloxy, 1-methyl-1-ethyl-2-propynylcarbonyloxy and 1-i-propyl-2-propynylcarbonyloxy groups.

Illustrative examples of the aryl group of 6 to 11 carbon atoms, the halogenated aryl group of 6 to 11 carbon atoms, the heteroaryl group of 3 to 11 carbon atoms and the halogenated heteroaryl group of 3 to 11 carbon atoms include phenyl, o-chlorophenyl, m-chlorophenyl, p-chlorophenyl, o-fluorophenyl, p-fluorophenyl, α-naphthyl, β-naphthyl, furyl, chlorofuryl, fluorofuryl, thienyl, chlorothienyl, fluorothienyl, pyrrolyl, chloropyrrolyl, fluoropyrrolyl, imidazolyl, chloroimidazolyl and fluoroimidazolyl groups.

To minimize dissolution to the electrolyte solution, the fused-ring quinone-substituted polynorbornene of the invention has a weight-average molecular weight (Mw) of preferably at least 1,000, more preferably at least 10,000, and even more preferably at least 100,000. From the standpoint of solubility in the subsequently described electrode slurry-forming solvent, the molecular weight is preferably not more than 500,000, more preferably not more than 300,000, and even more preferably not more than 200,000. In this invention, Mw refers to the polystyrene-equivalent weight-average molecular weight measured by gel permeation chromatography (GPC).

Next, methods for synthesizing the fused-ring quinone-substituted polynorbornene of the invention are described. The methods described below are some of the methods that may be used to synthesize the inventive polymer, and are not intended by way of limitation.

For example, a polymer having recurring units of formula (1-1), wherein X is a single bond, $R^1$ to $R^7$ are all hydrogen atoms and $n^1$ is 1, can be synthesized according to Scheme A below.

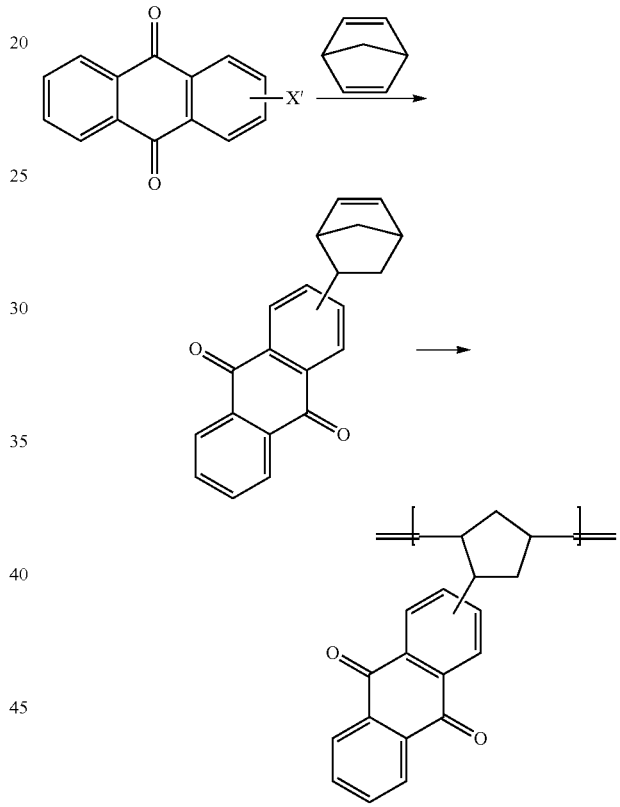

Scheme A

Here, X' is a halogen atom.

A polymer having recurring units of formula (1-1), wherein X is —C(O)OCH$_2$—, $R^1$ to $R^7$ are all hydrogen atoms and $n^1$ is 1, can be synthesized according to Scheme B below.

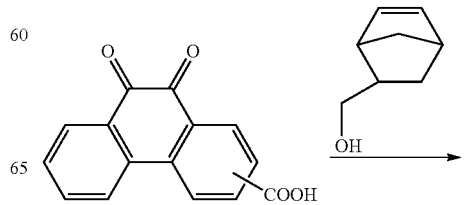

Scheme B

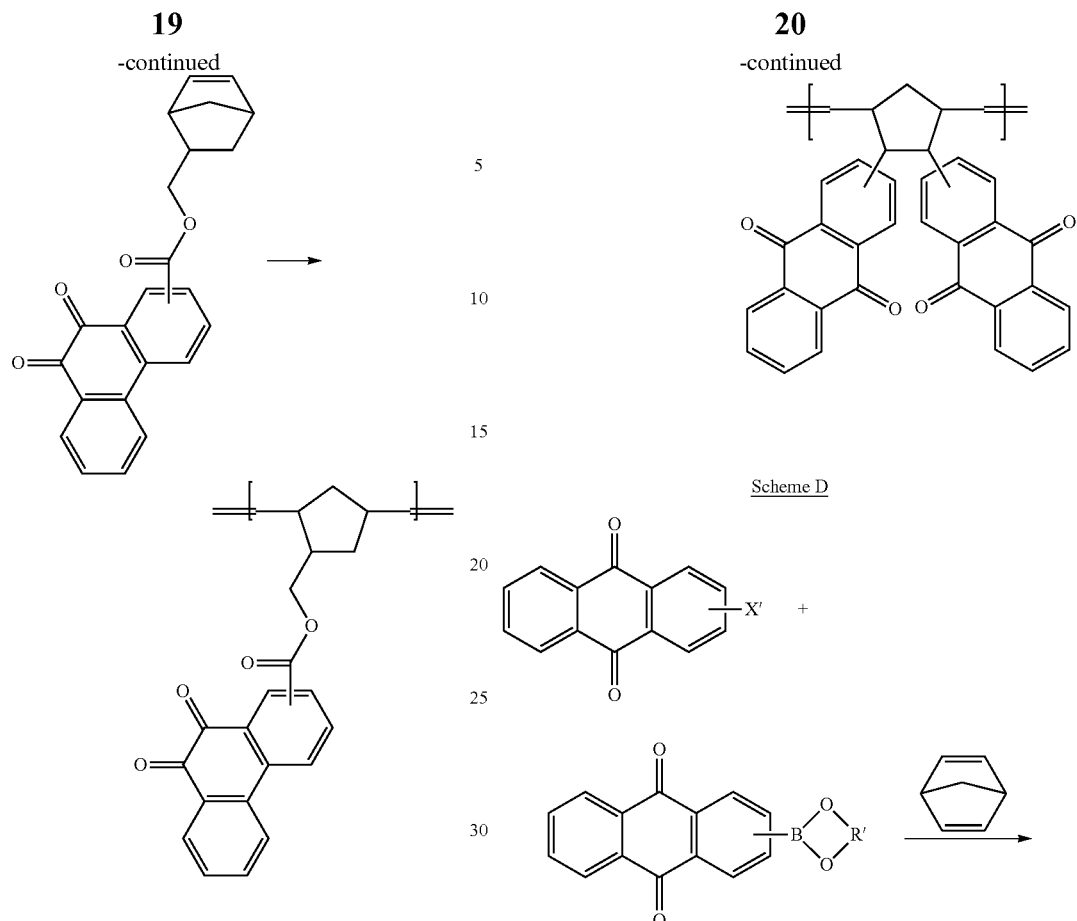

A polymer having recurring units of formula (1-1), wherein X is a single bond, $R^1$ to $R^7$ are all hydrogen atoms and $n^1$ is 2, can be synthesized according to Scheme C or D below.

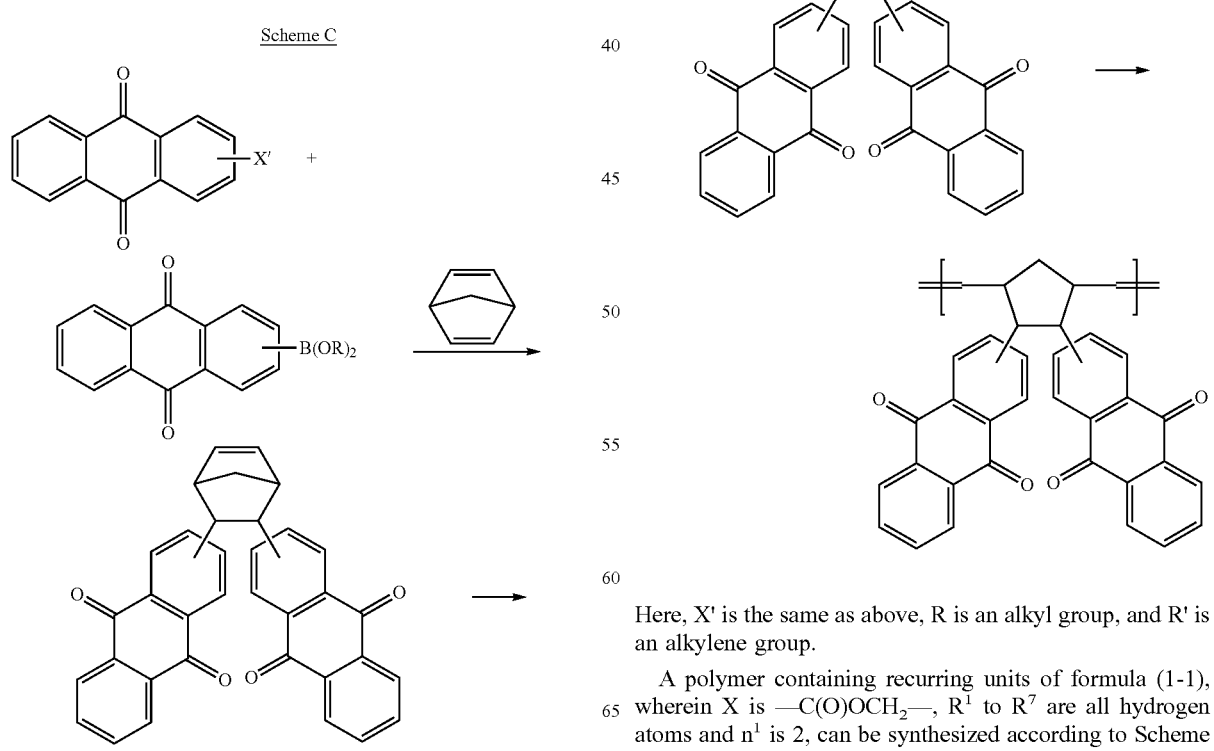

Here, X' is the same as above, R is an alkyl group, and R' is an alkylene group.

A polymer containing recurring units of formula (1-1), wherein X is $-C(O)OCH_2-$, $R^1$ to $R^7$ are all hydrogen atoms and $n^1$ is 2, can be synthesized according to Scheme E below.

Scheme E

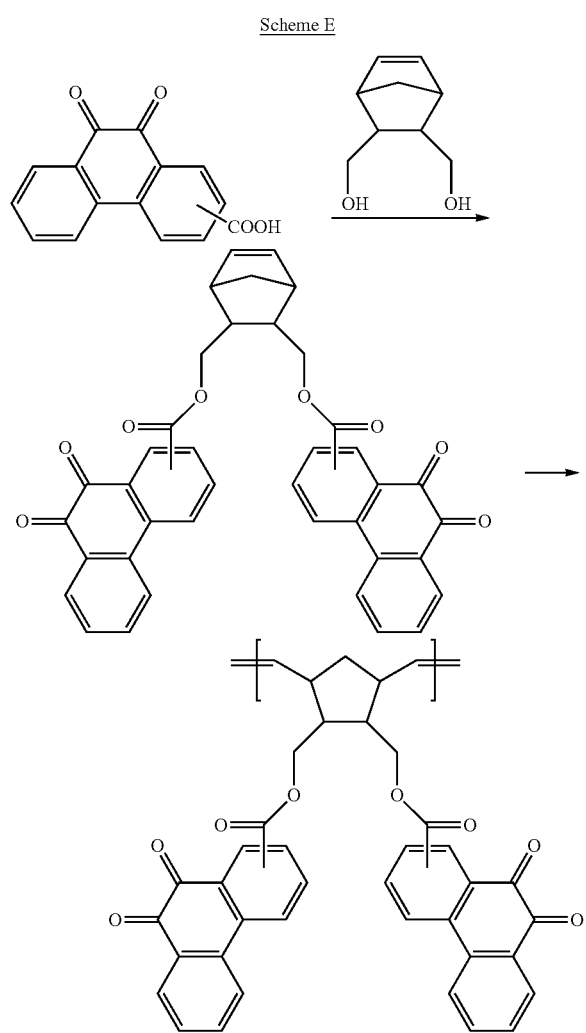

In Schemes A to E, the first stage is the step of synthesizing a fused-ring quinone-substituted norbornene derivative monomer. In this step, a coupling reaction, esterification reaction or the like using a transition metal catalyst is applied within a solvent. However, the synthesis method is not particularly limited, provided it is a reaction that forms covalent bonds between the norbornene derivative and the fused quinone derivative.

Illustrative examples of the solvent include water, common organic solvents such as tetrahydrofuran, dioxane, chloroform, dichloroethane, toluene, xylene, chlorobenzene, 1,2-dichlorobenzene, N,N-dimethylformamide, N,N-dimethylacetamide and N-methylpyrrolidone, and mixed solvents thereof. Illustrative examples of the catalyst include tetrakis(triphenylphosphine)palladium(0) (PdPPh$_3$)$_4$), [1,1'-bis(diphenylphosphino)ferrocene]palladium(II) dichloride (PdCl$_2$(dppf)), palladium(II) acetate, 4-(4,6-dimethoxy-1,3,5-triazin-2-yl)-4-methylmorpholinium chloride (DMT-MM), N,N-dimethylaminopyridine (DMAP), dicyclohexylcarbodiimide (DCC) and 1-(3-dimethylaminopropyl)-3-ethylcarbodiimide hydrochloride (EDC.HCl).

The reaction temperature is preferably from about 0° C. to about 150° C., and more preferably from about 50° C. to about 100° C. The reaction time is preferably from about 1 hour to about 24 hours, and more preferably from about 12 hours to about 16 hours.

In Schemes A to E, the second stage is the step of polymerizing the monomer to form a polymer. Polymerization is generally carried out by ring-opening metathesis polymerization. Specifically, this polymerization may be carried out by a method known to the art, such as the olefin metathesis reaction using Grubbs' catalyst. Regioisomers and stereoisomers that form as by-products during synthesis may be present within the reaction product. Commercial starting materials and reagents may be used to carry out the synthesis.

Charge Storage Material

The fused-ring quinone-substituted polynorbornene of the invention may be suitably used as a charge storage material. A charge storage material is a material that can store electric charge. This is useful as, for example, an electrode active material in secondary batteries.

Secondary Battery

The secondary battery of the invention is characterized by using a charge storage material composed of the above-described fused-ring quinone-substituted polynorbornene as an electrode active material. Other constituent members of the battery cell may be suitably selected from among conventional known members and used.

An ordinary secondary battery is explained here by way of illustration.

A secondary battery is generally composed of a positive electrode layer, a negative electrode layer, a separator layer situated between the positive electrode layer and the negative electrode layer, and an electrolyte solution that fills the interior of the cell containing all of these elements. The positive electrode layer and negative electrode layer are each formed, on a substrate that is a current collector, as a thin-film which includes an electrode active material, an optional conductive additive of carbon or the like for enhancing the conductivity of the electrode layer, and an optional binder for enhancing the uniformity of film formation, increasing ionic conductivity and minimizing dissolution to the electrolyte solution. The electrolyte solution is composed of an electrolyte made of a salt that serves as the ion conductor, a solvent and the like.

The fused-ring quinone-substituted polynorbornene of the invention is used as the electrode active material in this positive electrode layer or negative electrode layer. There is no particular limitation on which of the electrode layers—the positive electrode layer or the negative electrode layer—in which to use the electrode active material, this being determined according to whether the corresponding electrode has a noble potential or a base potential. Alternatively, this electrode active material may be used in both electrodes.

The form of the secondary battery and the types of electrode active material and electrolyte solution are not particularly limited. Use may be made of, for example, any of the following: lithium ion batteries, nickel-hydrogen batteries, manganese batteries, and air batteries. Nor are there any particular limitations on the lamination method and the production method.

The electrode layer can be produced by mixing together the fused-ring quinone-substituted polynorbornene of the invention, a solvent and, optionally, a conductive additive, a binder and other electrode active materials known to the art so as to prepare an electrode slurry, and using this slurry to form a thin-film on a substrate. The method of forming the thin-film is not particularly limited; use can be made of various hitherto known methods. Illustrative examples include various printing methods, such as offset printing, screen printing and gravure printing, and also dip coating, spin coating, bar coating, slit (die) coating and inkjet printing methods that use a solution, suspension or slurry obtained by dissolving or suspending a material containing the fused-ring quinone-substituted polynorbornene of the invention in a solvent.

Illustrative examples of the current collector used as the material underlying the electrode layer include metal foils or substrates of aluminum, copper, lithium, stainless steel, iron, chromium, platinum, gold or the like; alloy foils or substrates composed of any combination of these metals; oxide substrates such as indium-tin oxide (ITO), indium-zinc oxide (IZO) and antimony-tin oxide (ATO); carbon substrates such as glassy carbon, pyrolytic graphite and carbon felt; and carbon-coated foils such as metal foils coated with a carbon material.

Illustrative examples of the conductive additive include carbon materials such as graphite, carbon black, acetylene black, vapor-grown carbon fibers (VGCF), carbon nanotubes, carbon nanohorns and graphene; and electrically conductive polymers such as polyaniline, polypyrrole, polythiophene, polyacetylene and polyacene. A single type of conductive additive may be used alone or two or more types may be used in combination.

Illustrative examples of the binder include polytetrafluoroethylene, polyvinylidene fluoride, polyhexafluoropropylene, vinylidene fluoride-hexafluoropropylene copolymer, polyvinyl chloride, polycarbonate, polystyrene, polyacrylic acid, polyacrylic acid salts, polyacrylic acid esters, polymethacrylic acid, polymethacrylic acid salts, polymethacrylic acid esters, polyester, polysulfone, polyphenylene oxide, polybutadiene, poly(N-vinylcarbazole), hydrocarbon resins, ketone resins, phenoxy resins, polyamide, ethyl cellulose, vinyl acetate, ABS resins, SBR resins, polyurethane resins, melamine resins, unsaturated polyester resins, alkyd resins, epoxy resins, silicone resins, and copolymers or polymer blends composed of any combination of these.

Illustrative examples of the electrode slurry-forming solvent include N-methyl-2-pyrrolidone (NMP), dimethylsulfoxide (DMSO), ethylene carbonate, propylene carbonate, dimethyl carbonate, diethyl carbonate, methyl ethyl carbonate, γ-butyrolactone, tetrahydrofuran (THF), dioxolane, sulfolane, dimethylformamide (DMF), dimethylacetamide (DMAc), water, 2-propanol and propylene glycol.

When an electrode active material containing the fused-ring quinone-substituted polynorbornene of the invention is used in the positive electrode layer, the negative electrode active material included in the negative electrode layer is exemplified by carbon materials such as graphite, carbon black, acetylene black, vapor-grown carbon fibers (VGCF), carbon nanotubes, carbon nanohorns and graphene; lithium and lithium alloys such as Li—Al, Li—Si and Li—Sn; and silicon, SiO, $SiO_2$, Si—$SiO_2$ composites, tin, SnO, $SnO_2$, PbO, $PbO_2$, GeO, $GeO_2$, $WO_2$, $MoO_2$, $Fe_2O_3$, $Nb_2O_5$, $TiO_2$, $Li_4Ti_5O_{12}$ and $Li_2Ti_3O_7$. When an electrode active material containing the fused-ring quinone-substituted polynorbornene of the invention is used in the negative electrode layer, it may also be used together with these negative electrode active materials.

When the fused-ring quinone-substituted polynorbornene-containing electrode active material of the invention is used in a negative electrode layer, the positive electrode active material included in the positive electrode layer is exemplified by organic electrode active materials such as nitroxyl radical-containing compounds, organosulfur polymers, quinone polymers other than fused-ring quinone-substituted polynorbornene, quinoid materials, dione materials and rubeanic acid materials; and inorganic electrode active materials such as $LiCoO_2$, $LiMn_2O_4$, $LiNiO_2$, $LiNi_{0.5}Mn_{0.5}O_2$, $LiFePO_4$, $LiMnPO_4$, $LiCoPO_4$, $Fe_2(SO_4)_3$, $LiMnSiO_4$ and $V_2O_5$. When the fused-ring quinone-substituted polynorbornene-containing electrode active material of the invention is used in the positive electrode layer, it may also be used together with these positive electrode active materials.

The fused-ring quinone-substituted polynorbornene-containing electrode active material of the invention may be used as an air electrode (positive electrode) in an air battery. In such cases, in addition to the above-mentioned negative electrode active materials, sodium, magnesium, aluminum, calcium, zinc or the like may be used as a negative electrode active material included within the negative electrode layer.

In cases where a positive electrode is used as the air electrode in an air battery, in addition to the fused-ring quinone-substituted polynorbornene of the invention, an inorganic material such as manganese oxide or a nitroxyl radical-containing material such as a TEMPO polymer may be concomitantly used as a redox auxiliary within the positive electrode layer.

The thickness of the electrode layer, although not particularly limited, is preferably from about 0.01 μm to about 1,000 μm, and more preferably from about 0.1 μm to about 100 μm.

The material used in the separator layer is exemplified by porous polyolefins, polyamides and polyesters.

The electrolyte in the electrolyte solution is exemplified by lithium salts such as $LiPF_6$, $LiBF_4$, $LiN(C_2F_5SO_2)_2$, $LiAsF_6$, $LiSbF_6$, $LAlF_4$, $LiGaF_4$, $LiInF_4LiClO_4$, $LiN(CF_3SO_2)_2$, $LiCF_3SO_3$, $LiSiF_6$ and $LiN(CF_3SO_2)(C_4F_9SO_2)$; metal iodides such as LiI, NaI, KI, CsI and $CaI_2$; iodide salts of quaternary imidazolinium compounds, iodide salts and perchlorate salts of tetraalkylammonium compounds; and metal bromides such as LiBr, NaBr, KBr, CsBr and $CaBr_2$.

Use can also be made of solid electrolytes such as polyethylene oxide materials, thio-LISICON materials such as $Li_2S$—$P_2S_5$, and polymer compounds obtained by polymerizing or copolymerizing monomers such as hexafluoropropylene, tetrafluoroethylene, trifluoroethylene, ethylene, propylene, acrylonitrile, vinylidene chloride, acrylic acid, methacrylic acid, methyl acrylate, ethyl acrylate, methyl methacrylate, styrene and vinylidene fluoride.

The solvent in the electrolyte solution is not particularly limited, provided it is one that dissolves the electrolyte without degrading battery performance by causing corrosion or decomposition of the materials making up the battery. Illustrative examples include aqueous solvents such as water, and various nonaqueous solvents, including carbonates such as dimethyl carbonate, diethyl carbonate, ethyl methyl carbonate, ethylene carbonate, propylene carbonate and butylene carbonate, ethers such as THF, dimethoxyethane and tetraglyme, esters such as γ-butyrolactone, nitriles such as acetonitrile, amides such as N,N-dimethylformamide and N-methylpyrrolidone, sulfones such as ethyl isopropyl sulfone and sulfolane, alcohols such as 2-propanol and propylene glycol, and ionic liquids such as 1-butyl-3-methylimidazolinium hexafluorophosphate. A single type of solvent may be used alone or two or more types may be used in combination.

EXAMPLES

Synthesis Examples, Working Examples of the invention and Comparative Examples are given below by way of illustration, although the invention is not limited by these Examples. The instruments and measurement conditions used were as follows.
(1) $^1$H-NMR
ECX-500 Nuclear Magnetic Resonance Spectrometer from JEOL Ltd. (solvent, CDCl$_3$; internal standard, TMS)
(2) $^{13}$C-NMR
ECX-500 Nuclear Magnetic Resonance Spectrometer from JEOL Ltd. (solvent, CDCl$_3$; internal standard, TMS)
(3) FAB-MS
JMS-GCMATE II GCMS System, a magnetic sector mass spectrometer from JEOL Ltd.
(4) Elemental Analysis
PE2400 Series II Elemental Analyzer from Perkin Elmer
(5) IR Spectrum
FT/IR-6100 Fourier-Transform Infrared Spectrometer from JASCO Corporation.
(6) GPC
HLC 8220, from Tosoh Corporation
(7) Cyclic Voltammetry, Chronopotentiometry
ALS electrochemical analyzer from BAS Inc.

[1] Synthesis of Fused-Ring Quinone-Substituted Polynorbornene

Example 1: Synthesis of Polymer A

Example 1-1: Synthesis of 2-Iodoanthraquinone

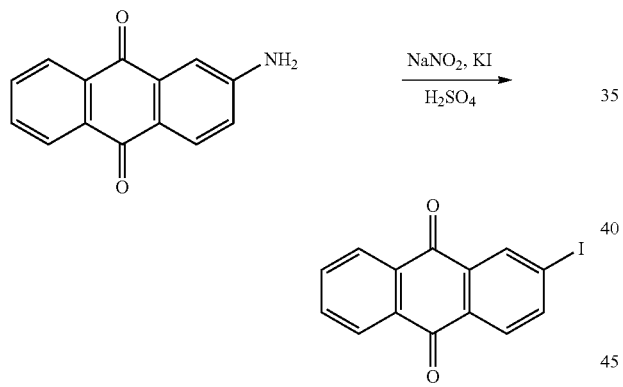

2-Aminoanthraquinone (5 g, 22.3 mmol) was added to a 100 mL beaker and dissolved in 20 g (204 mmol) of sulfuric acid. Next, 5 g (72.5 mmol) of sodium sulfite was slowly added and the reaction was carried out at 0° C. for 2 hours. Following the reaction, 1 L of ice water was prepared in a 2 L beaker, and the reaction mixture was poured therein. After 1 hour of stirring, the precipitated solids were removed by filtration and 2.5 g (15.1 mmol) of potassium iodide was added to the filtrate, which was then left at rest for 3 hours. The precipitate was recovered, following which 2.5 g (15.1 mmol) of potassium iodide was added to the filtrate, which was then left at rest for 3 hours. This operation was repeated three or four times. The recovered solids were liquid-liquid separated using chloroform/aqueous sodium thiosulfate solution, and the iodine was removed. Following liquid-liquid separation, column purification with dichloromethane yielded 2-iodoanthraquinone as a yellow solid. The $^1$H-NMR and FAB-MS results are given below.
$^1$H-NMR (CDCl$_3$, 500 MHz, ppm):
8.64 (d, 1H, Ph), 8.29 (m, 2H, Ph),
8.14 (m, 1H, Ph), 7.98 (m, 1H, Ph),
7.81 (m, 2H, Ph)
FAB-MS (m/z): Calculated, 334.11. Found, 334.90.

Example 1-2: Synthesis of 2-Pinacolboronanthraquinone

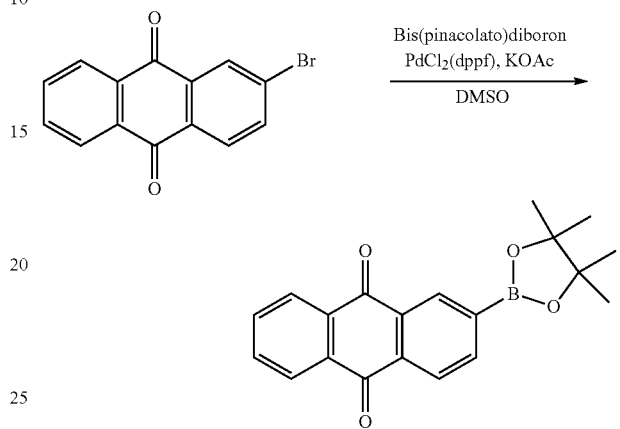

2-Bromoanthraquinone (1 g, 3.48 mmol), bis(pinacolato)diboron (973 mg, 3.83 mmol) and potassium acetate (1.02 g, 10.4 mmol) were added to a 30 mL round-bottomed flask, and dissolved in 20 mL of DMSO under an inert atmosphere. Next, 570 mg (0.7 mmol) of PdCl$_2$(dppf) dissolved in 3.2 mL of DMSO was added with a syringe and the reaction was carried out at 80° C. for 24 hours. Following reaction completion, the solvent was removed, and liquid-liquid separation with chloroform/saline and column purification with chloroform yielded 2-pinacolboronanthraquinone as a yellow powder. The $^1$H-NMR and FAB-MS results are given below.
$^1$H-NMR (CDCl$_3$, 500 MHz, ppm):
8.74 (s, 1H, Ph), 8.27 (m, 4H, Ph),
7.88 (m, 2H, Ph), 1.38 (s, 16H, CH$_3$)
FAB-MS (m/z): Calculated, 334.17. Found, 335.19.

Example 1-3: Synthesis of Compound A

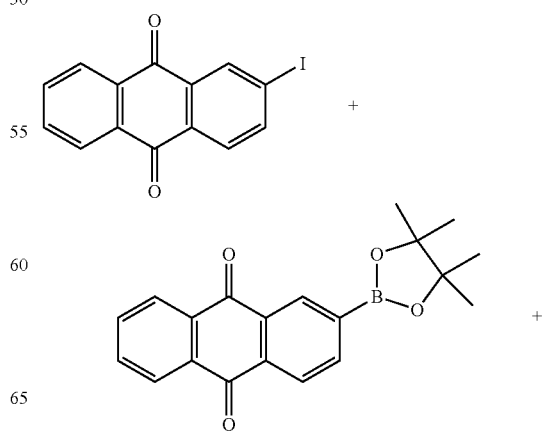

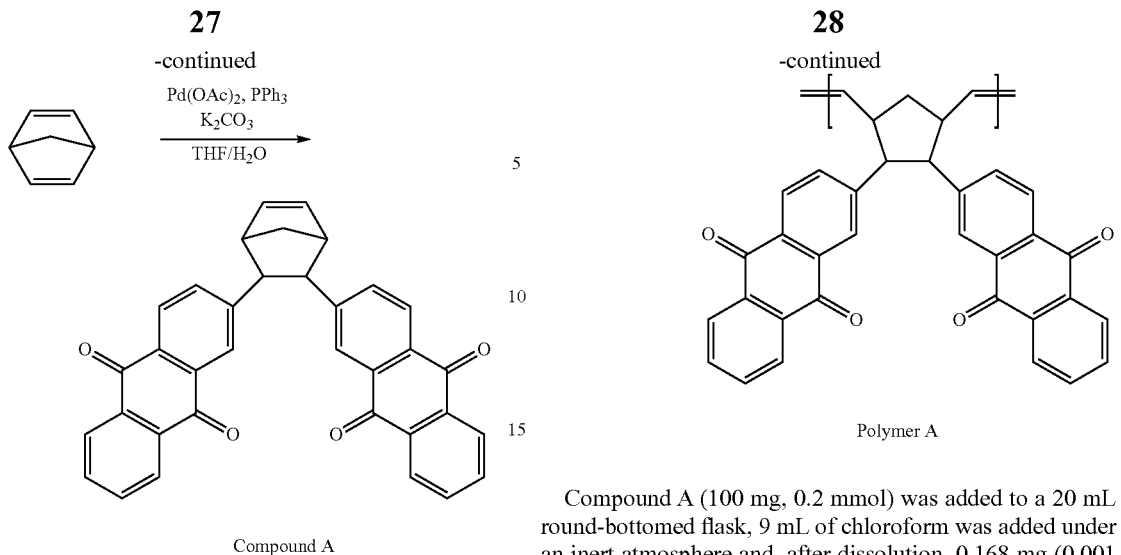

Compound A

2-Iodoanthraquinone (1 g, 3 mmol), 1.1 g (3.3 mmol) of 2-pinacolboronanthraquinone, and 1.1 g (7.92 mmol) of potassium carbonate were added to a 20 mL round-bottomed flask, after which these were dissolved by adding 10 mL of a THF/water (1/1) mixed solvent with a syringe under an inert atmosphere. Following dissolution, 1.2 mL of 2,5-norbornadiene was added and the system was heated to 60° C. Next, 27 mg (0.12 mmol) of Pd(OAc)$_2$ and 75.4 mg (0.29 mmol) of PPh$_3$ were dissolved in 2 mL of THF and subsequently added and the reaction was carried out at 60° C. for 24 hours. Following reaction completion, the solvent was removed and liquid-liquid separation using chloroform/saline and column purification with chloroform were carried out, yielding Compound A as a yellow solid. The $^1$H-NMR and FAB-MS results are given below.

$^1$H-NMR (CDCl$_3$, 500 MHz, ppm):

8.18 (m, 4H, Ph), 7.95 (d, 2H, Ph), 7.88 (d, 2H, Ph), 7.71 (m, 4H, Ph), 7.32 (dd, 2H, Ph), 6.53 (m, 2H, HC═CH), 3.48 (m, 2H, CH), 3.29 (m, 2H, CH), 2.45 (d, 1H, CH$_2$), 2.01 (d, 1H, CH$_2$)

FAB-MS (m/z): Calculated, 506.55. Found, 507.11.

Example 1-4: Synthesis of Polymer A

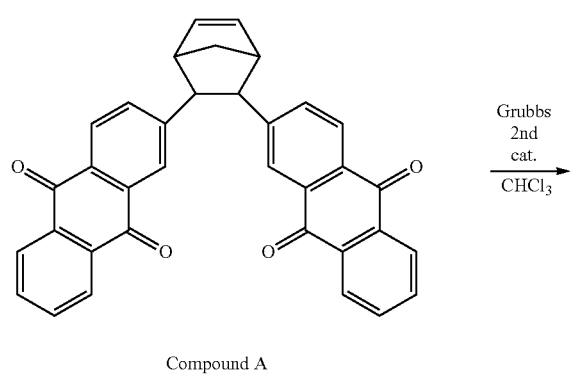

Compound A

Polymer A

Compound A (100 mg, 0.2 mmol) was added to a 20 mL round-bottomed flask, 9 mL of chloroform was added under an inert atmosphere and, after dissolution, 0.168 mg (0.001 eq., 0.2 μmol) of Grubb's second-generation catalyst dissolved in 1 mL of chloroform was added and the reaction was carried out at 60° C. for 20 hours. Following reaction completion, purification by precipitation in methanol, centrifugal separation and Soxhlet purification yielded Polymer A as a yellow powder. The $^1$H-NMR, IR and GPC results are given below.

$^1$H-NMR (CDCl$_3$, 500 MHz, ppm):

8.20-7.31 (br, 14H, Ar), 5.86-5.01 (br, 2H, —CH═), 3.88-2.50 (br, 6H, aliphatic)

IR (KBr, cm$^{-1}$): 1675 ($v_{c=o}$)

GPC (CHCl$_3$, 40° C., RID): Mw=6.0×10$^5$, Mw/Mn=1.5

Example 2: Synthesis of Polymer B

Example 2-1: Synthesis of 2-Iodo-9,10-Phenanthrenequinone

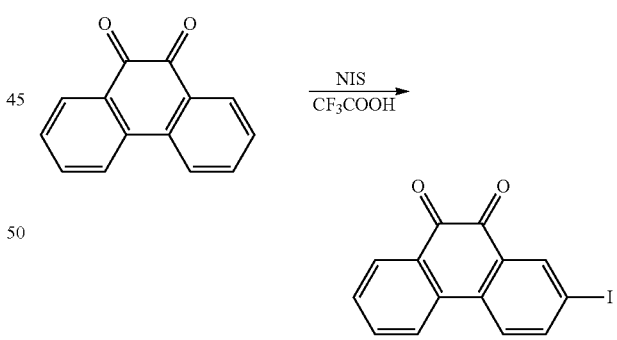

9,10-Phenanthrenequinone (2.08 g, 10 mmol) and 3.38 g (15 mmol) of N-iodosuccinimide were added to a 100 mL round-bottomed flask, following which 7.4 mL of trifluoroacetic acid was added under an inert atmosphere and a reaction was carried out at room temperature for 15 hours. Following reaction completion, liquid-liquid separation using chloroform/aqueous sodium thiosulfate solution and column purification with chloroform yielded 2-iodo-9,10-phenanthrenequinone as a red solid. The $^1$H-NMR and FAB-MS results are given below.

$^1$H-NMR (CDCl$_3$, 500 MHz, ppm):

8.49 (d, 1H, Ph), 8.19 (dd, 1H, Ph), 8.03 (dd, 1H, Ph), 7.98 (d, 1H, Ph), 7.73 (m, 2H, Ph), 7.50 (t, 1H, Ph)

FAB-MS (m/z): Calculated, 334.11. Found, 334.89.

Example 2-2: Synthesis of Compound B

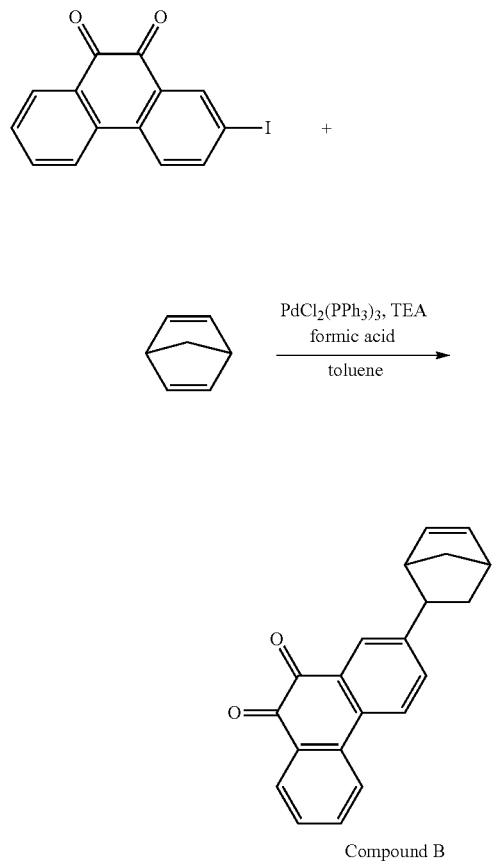

Compound B

2-Iodo-9,10-phenanthrenequinone (668 mg, 2 mmol) and 92 mg (0.08 mmol) of $PdCl_2(PPh_3)_2$ were added to a 50 mL flask, following which 20 mL of toluene, 0.6 mL (6 mmol) of 2,5-norbornadiene and 0.92 mL of triethylamine were added under an inert atmosphere and dissolution was effected at 80° C. Next, 0.16 mL of formic acid was added and the reaction was carried out at 80° C. for 15 hours. Following reaction completion, liquid-liquid separation with chloroform/saline and column purification with chloroform yielded Compound B as a red solid. The $^1$H-NMR and FAB-MS results are given below.

$^1$H-NMR (CDCl$_3$, 500 MHz, ppm):

8.15 (d, 1H, Ph), 8.08 (d, 1H, Ph), 7.96 (d, 1H, Ph), 7.91 (d, 1H, Ph), 7.68 (t, 1H, Ph), 7.61 (m, 1H, Ph), 7.43 (t, 1H, Ph), 6.27 (dd, 1H, HC=CH), 6.19 (dd, 1H, HC=CH, 3.02 (s, 1H, CH), 2.95 (s, 1H, CH), 2.75 (m, 1H, CH), 1.73 (m, 2H, CH$_2$), 1.51 (m, 2H, CH$_2$)

FAB-MS (m/z): Calculated, 300.4. Found, 301.3.

Example 2-3: Synthesis of Polymer B

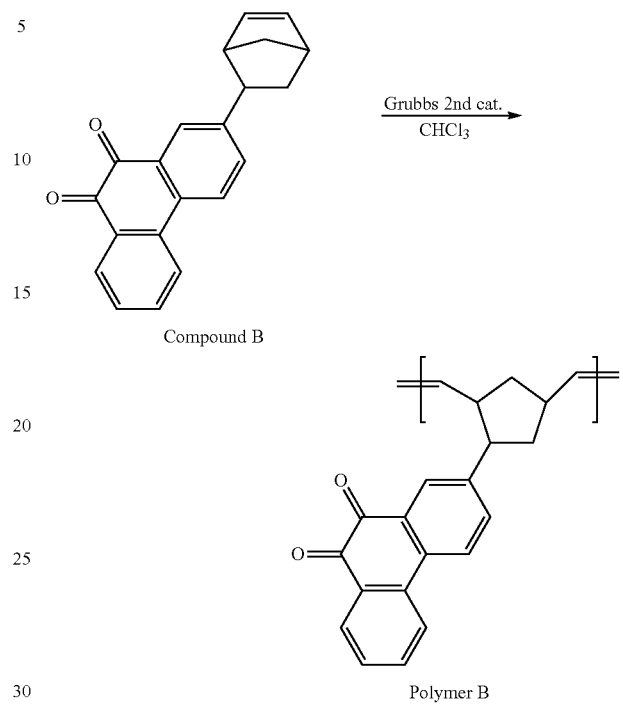

Compound B (100 mg, 0.33 mmol) and 2.83 mg (0.0033 mmol) of Grubbs' second-generation catalyst were added to a 10 mL flask, following which 0.5 mL of chloroform was added under an inert atmosphere and the reaction was carried out at 60° C. for 12 hours. Following reaction completion, Soxhlet purification with chloroform yielded Polymer B.

GPC (CHCl$_3$, 40° C., RID): insoluble

Example 3: Synthesis of Polymer C

Example 3-1: Synthesis of 9,10-Phenanthrenequinone-3-Carboxylic Acid

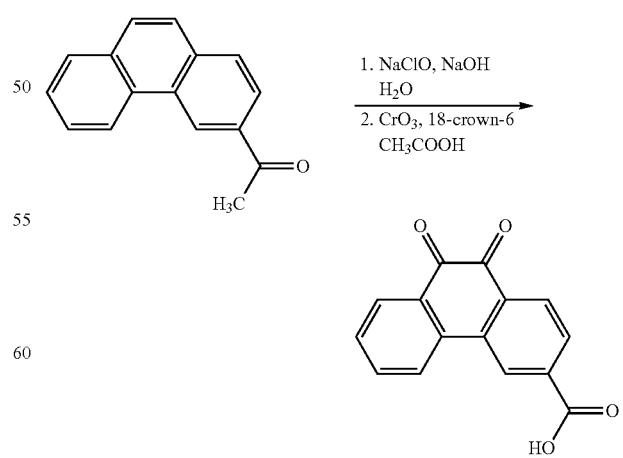

3-Acetylphenanthrene (500 mg, 2.27 mmol) was added to a 200 mL flask and dissolved in 10 mL of 1,4-dioxane. Next, 32 mL of sodium hypochlorite (active chlorine concentration, 5%), and 1.72 g of sodium hydroxide dissolved in 46.8 mL of water were added and the reaction was carried out at 65° C. for 6 hours. Following reaction completion, the system was cooled to room temperature, about 13 g of sodium thiosulfate was added, and neutralization was effected under stirring. The white solid that precipitated out was washed with water and diethyl ether, yielding phenanthrene-3-carboxylic acid as a white solid.

Next, 489 g (2.20 mmol) of the phenanthrene-3-carboxylic acid was added to a 100 mL flask and dissolved in 20 mL of acetic acid. Chromium(VI) oxide (808 mg, 8.80 mmol, 4 eq.) and 90 mg (0.367 mmol, 0.167 eq.) of 18-crown-6 were added to a separate vessel and dissolved in a mixed solvent of 10 mL of acetic acid and 1 mL of pure water. When completely dissolved, the solution was poured into the flask and the reaction was carried out at 60° C. for 16 hours. Following reaction completion, pure water was added and the yellow solid that precipitated out was washed with a mixed solvent of acetic acid/pure water (1/1) and with diethyl ether, yielding 9,10-phenanthrenequinone-3-carboxylic acid as a yellow solid. The $^1$H-NMR and FAB-MS results are given below.

$^1$H-NMR (DMSO-d$_6$, 500 MHz, ppm):
13.5 (s, 1H, OH), 8.66 (s, 1H, Ph),
8.30 (d, 1H, Ph), 8.09 (d, 1H, Ph),
8.03 (d, 1H, Ph), 7.99 (d, 1H, Ph),
7.76 (t, 1H, Ph), 7.54 (t, 1H, Ph)
FAB-MS (m/z): Calculated, 252.0. Found, 253.4.

Example 3-2: Synthesis of Compound C

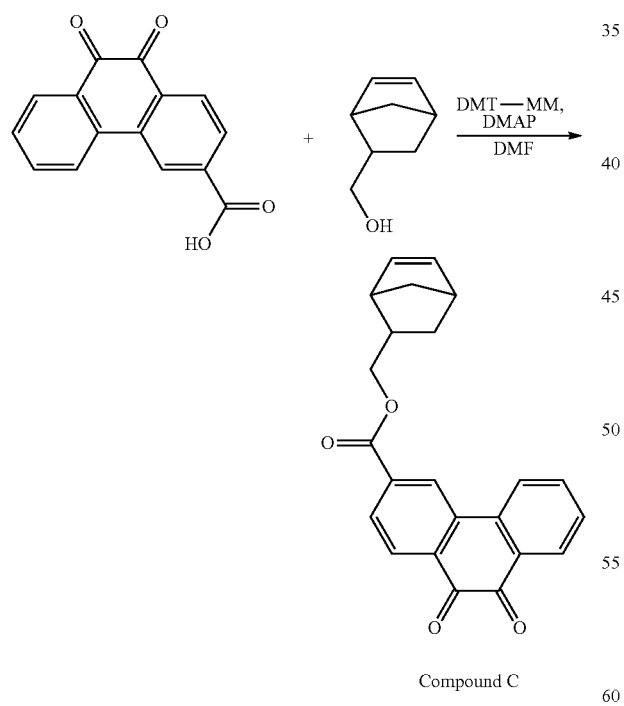

Compound C

Phenanthrenequinone-3-carboxylic acid (504 mg, 2 mmol), 300 mg (2.4 mmol) of 5-norbornene-2-methanol, 1.1 g (4 mmol) of DMT-MM and 200 mg (1.6 mmol) of DMAP were added to a 200 mL flask, dissolved in 20 mL of DMF, and reacted at room temperature for 14 hours. Following reaction completion, water was poured in and the precipitated solid was recovered. Column purification with chloroform/ethyl acetate yielded Compound C as a yellow solid. The $^1$H-NMR and FAB-MS results are given below.

$^1$H-NMR (CDCl$_3$, 500 MHz, ppm):
8.69 (d, 1H, Ph), 8.23 (m, 2H, Ph),
8.10 (m, 2H, Ph), 7.77 (m, 1H, Ph),
7.51 (m, 1H, Ph), 6.25-6.00 (br, 2H, HC=CH),
4.51-3.97 (br, 2H, CHO,
3.03-2.55 (br, 2H, CHO, 1.94 (m, 1H, CH),
1.55-0.65 (br, 4H, CHO
FAB-MS (m/z): Calculated, 358.12. Found, 359.30.

Example 3-3: Synthesis of Polymer C

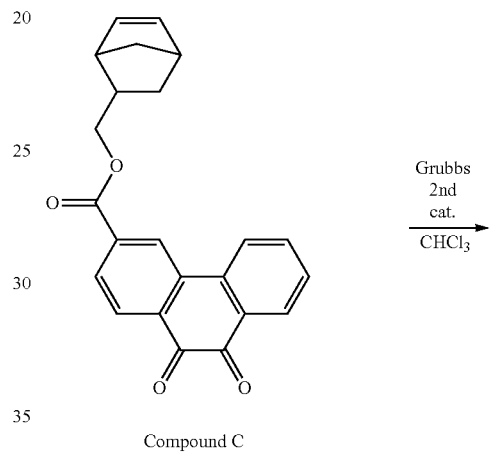

Compound C

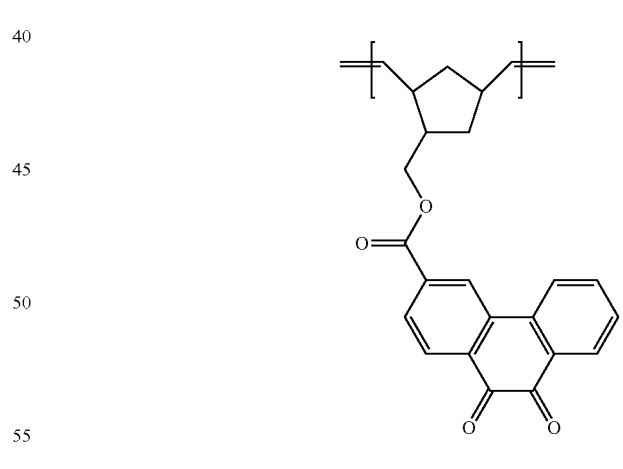

Polymer C

Compound C (179 mg, 0.5 mmol) and 4.2 mg (5 μmol) of Grubb's second-generation catalyst were added to a 10 mL flask, following which 1 mL of chloroform was added under an inert atmosphere, and the reaction was carried out at 40° C. for 12 hours. Following reaction completion, purification by precipitation in methanol and Soxhlet purification yielded Polymer C.

GPC (CHCl$_3$, 40° C., RID): Mw=1.1×10$^4$, Mw/Mn=1.8

Example 4: Synthesis of Polymer D

Example 4-1: Synthesis of Compound D

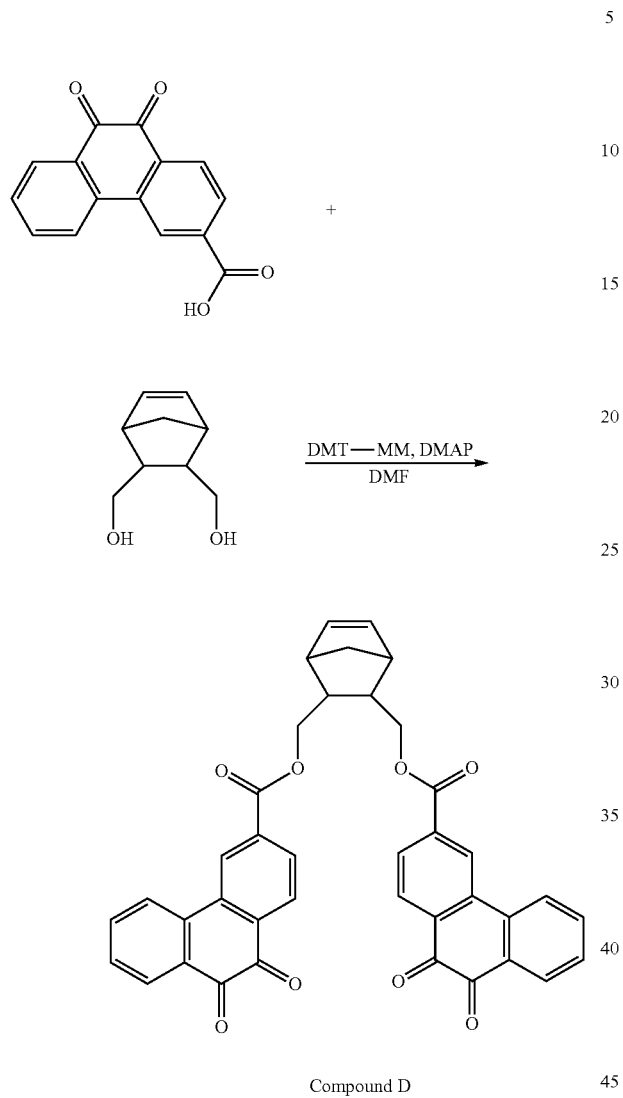

Compound D

Phenanthrenequinone-3-carboxylic acid (504 mg, 2 mmol), 154 mg (1 mmol) of 5-norbornene-2,3-dimethanol, 1.33 g (4.8 mmol) of DMT-MM and 195 mg (1.6 mmol) of DMAP were added to a 30 mL flask and dissolved in 10 mL of DMF, and the reaction was carried out at room temperature for 15 hours. Following reaction completion, water was added. The solids that precipitated out were collected and column purified with chloroform/ethyl acetate, yielding Compound D as a yellow solid. The $^1$H-NMR and FAB-MS results are given below.

$^1$H-NMR (CDCl$_3$, 500 MHz, ppm):

8.63 (s, 2H, Ph), 8.15 (m, 4H, Ph), 8.04 (m, 4H, Ph), 7.71 (t, 2H, Ph), 7.47 (t, 2H, Ph), 6.29 (m, 2H, HC=CH), 4.60 (m, 4H, CH$_2$), 2.92 (m, 2H, CH), 2.20 (m, 2H; CH), 1.60 (dd, 2H, CH$_2$)

FAB-MS (m/z): Calculated, 622.16. Found, 623.37.

Example 4-2: Synthesis of Polymer D

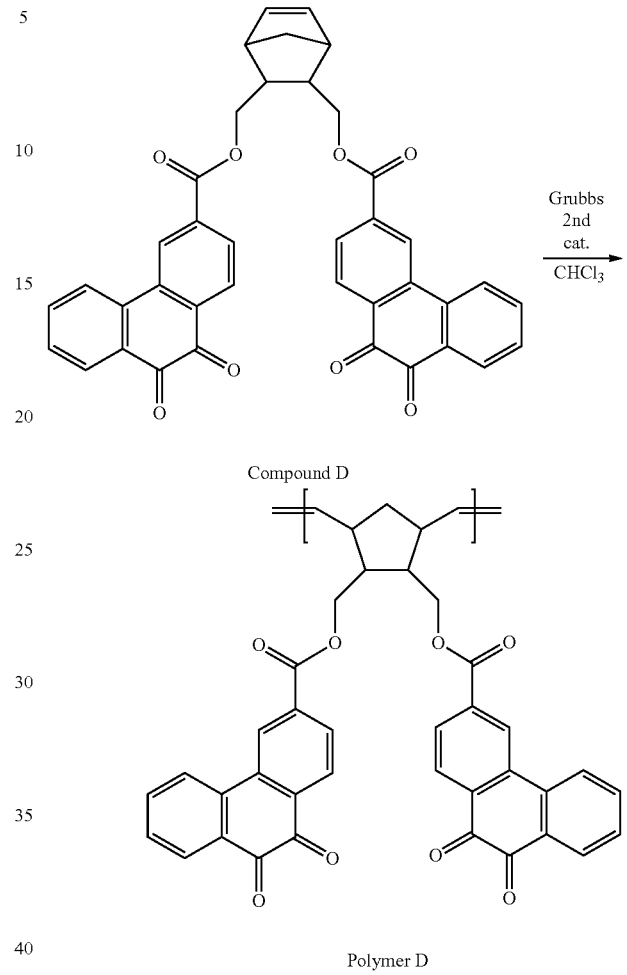

Polymer D

Compound D (124 mg, 0.2 mmol) and 1.72 mg (2 mmol) of Grubbs' second-generation catalyst were added to a 5 mL flask, following which 2 mL of chloroform was added under an inert atmosphere and the reaction was carried out at 40° C. for 16 hours. Following reaction completion, purification by precipitation in methanol and Soxhlet purification yielded Polymer D.

GPC (CHCl$_3$, 40° C., RID): insoluble

[2] Evaluation of Fused-Ring Quinone-Substituted Polynorbornene-Containing Electrode and Battery

Example 5: Cyclic Voltammetry of Thin-Film Electrode Produced Using Polymer a First; 300 μL of a 0.5 mg/mL solution of Polymer A in chloroform was added dropwise to a glassy carbon substrate and dried, giving a Polymer A thin-film electrode.

Next, the resulting electrode was immersed in an electrolyte solution, thereby impregnating the electrolyte solution into voids in the electrode. A 10 mol/L aqueous solution of sodium hydroxide was used as the electrolyte solution.

A beaker cell 1 like that shown in FIG. 1 was created by setting this thin-film electrode 11 as the working electrode, a platinum electrode 12 as the counter electrode and an Ag/AgCl electrode 13 as the reference electrode within a beaker, and adding thereto an electrolyte solution 14 similar to that described above.

Figure 2:
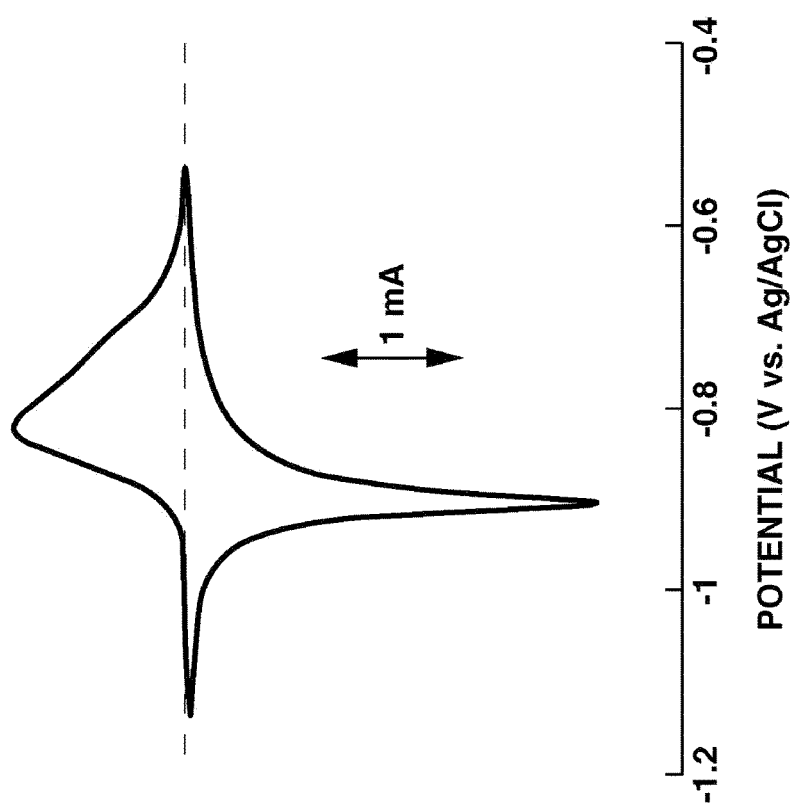
FIG. 2 is a cyclic voltammogram of the thin-film electrode produced in Example 5.

Using this beaker cell 1, cyclic voltammetry was carried out at a sweep rate of 5 mV/sec. The results are shown in FIG. 2. As is apparent from FIG. 2, for the thin-film electrode produced using Polymer A, a one-step four-electron redox wave appears at $E_{1/2}=-0.86$ V, and decay and dissolution were not observed.

Figure 3:
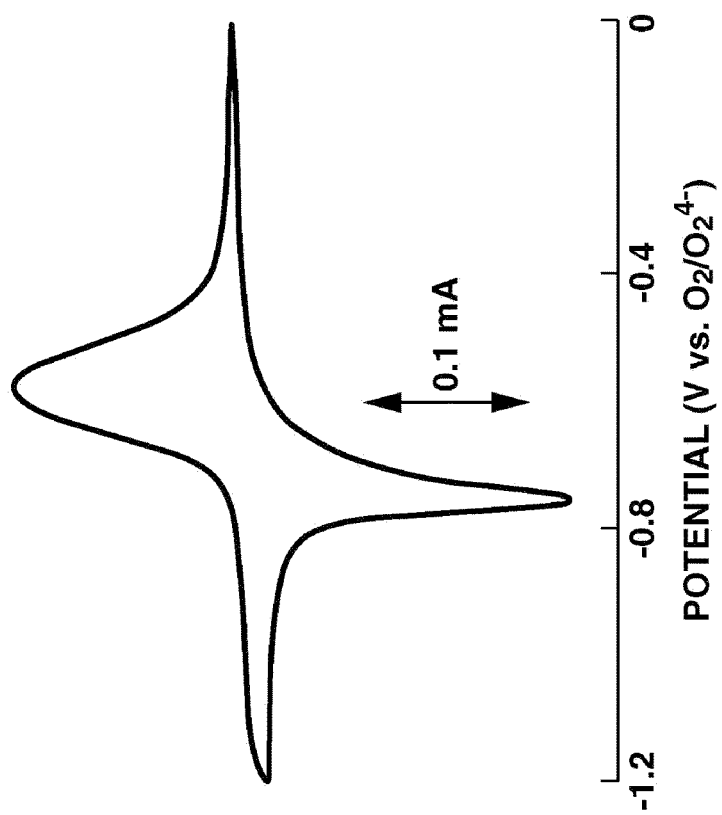
FIG. 3 is a cyclic voltammogram of the air secondary battery produced in Example 6.
Figure 4:
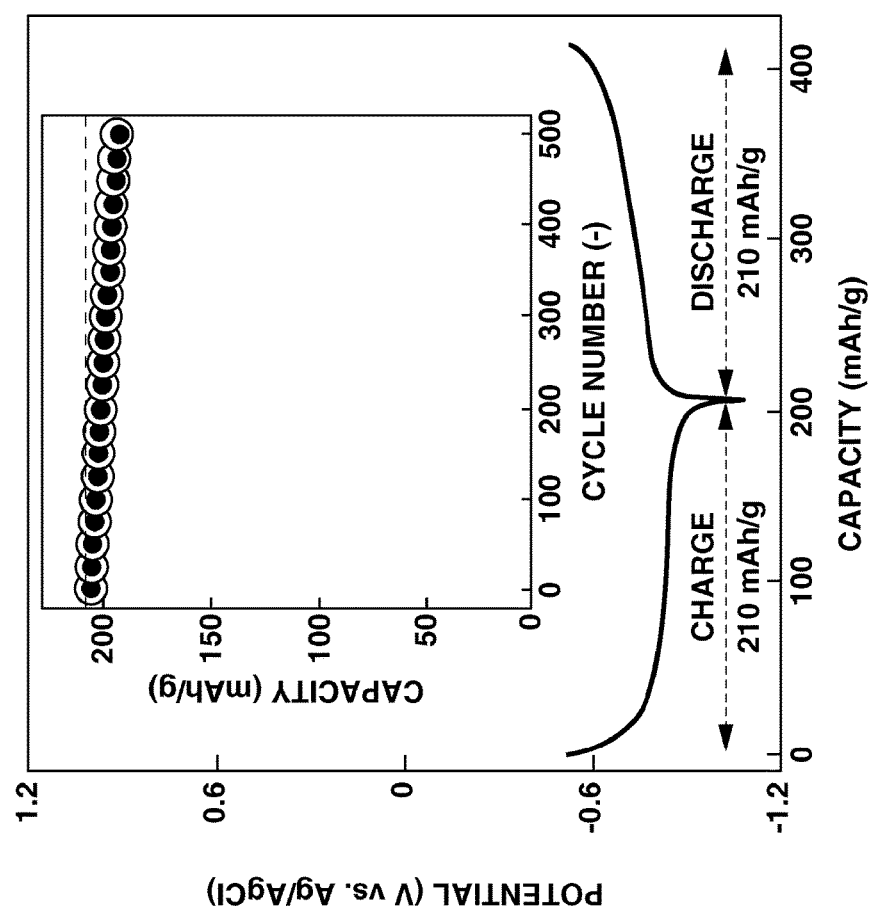
FIG. 4 is a graph showing the results of measurements of the potential difference with a reference electrode when the charge-discharge capacity was varied, and a graph showing the charge-discharge cycle characteristics, in the air secondary battery produced in Example 6.

Example 6: Evaluation of Air Secondary Batteries Produced Using Polymer A in Electrode An air secondary battery was fabricated by using the Polymer A thin-film electrode produced in Example 5 as the negative electrode and using an oxygen reduction catalyst electrode as the positive electrode, and using a 10 mol/L aqueous sodium hydroxide solution as the electrolyte solution. Cyclic voltammetry was carried out at a sweep rate of 5 mV/sec. A reversible redox wave appeared at $E_{1/2}=-0.67$ V (vs. $O_2/O_2^+$). When chronopotentiometry was carried out in the range of −0.55 V to −1.1 V, a plateau that coincides with the redox wave was observed, indicating a coulombic efficiency of 100%. Even after repeating 300 charge-discharge cycles, 96% of the initial capacity was retained, demonstrating that Polymer A is a material having high cycle characteristics. FIG. 3 shows the cyclic voltammetry results, and FIG. 4 is a graph showing both the results of measurements of the potential difference with the reference electrode when the charge-discharge capacity was varied, and also the charge-discharge cycle characteristics.

Examples 7 and 8: Cyclic Voltammetry of Thin-Film Electrodes Produced Using Polymers B and C Cyclic voltammetry was carried out using the beaker cell shown in FIG. 1.

Vapor-grown carbon fibers (80 mg) and 10 mg of polyvinylidene fluoride binder dissolved in 1.5 g of NMP were added to 10 mg of Polymer B synthesized in Example 2 (Example 7) or Polymer C synthesized in Example 3 (Example 8), and kneaded in a ball mill. The mixture obtained after about 15 minutes of mixing was coated onto a glassy carbon substrate and vacuum dried under applied heat at room temperature (20° C.) for 12 hours, giving a thin-film electrode 11.

Next, the resulting electrode was immersed in an electrolyte solution, thereby impregnating the electrolyte solution into voids in the electrode. A 1 mol/L γ-butyrolactone solution of lithium perchlorate was used as the electrolyte solution.

A beaker cell 1 like that shown in FIG. 1 was created by setting this thin-film electrode 11 as the working electrode, a platinum electrode 12 as the counter electrode and an Ag/AgCl electrode 13 as the reference electrode within a beaker, and adding thereto an electrolyte solution 14 similar to that described above.

Figure 5:
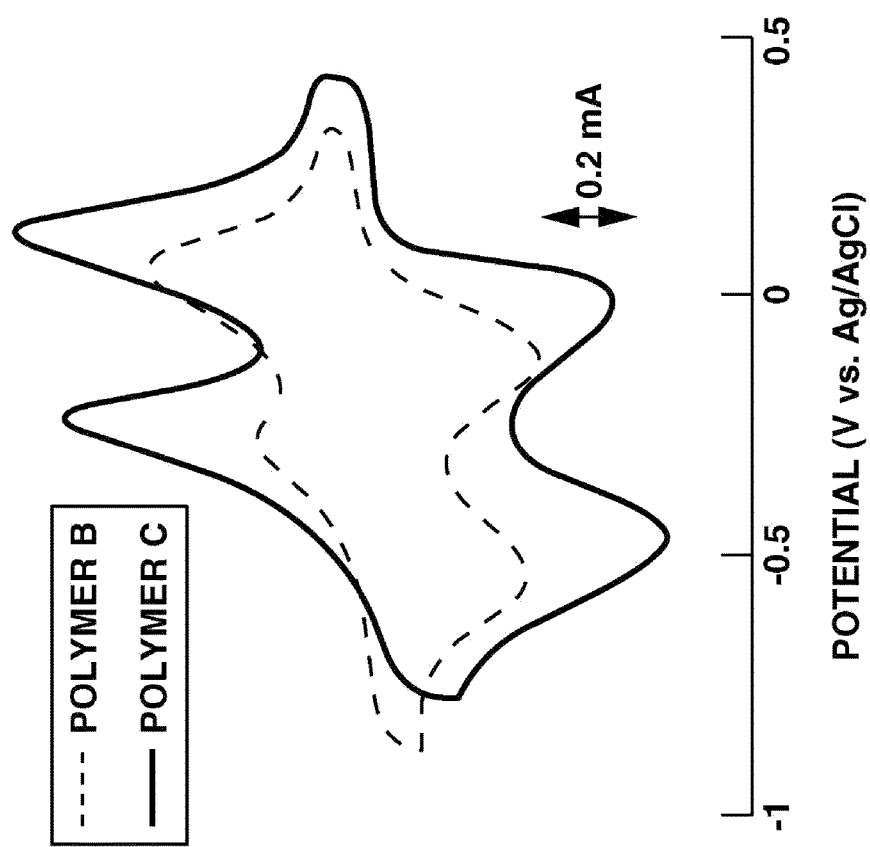
FIG. 5 shows a cyclic voltammogram of the air secondary batteries produced in Examples 7 and 8.

Using this beaker cell 1, cyclic voltammetry was carried out at a sweep rate of 10 mV/sec. The results are shown in FIG. 5. In FIG. 5, the solid line represents Example 7 (Polymer B) and the dashed line represents Example 8 (Polymer C). As is apparent from FIG. 5, owing to the electron-withdrawing properties of the ester when Polymer C was used, a more noble redox potential was obtained.

Examples 9 and 10: Evaluation of Batteries Produced Using Polymers B and C in Electrode (Beaker Cell)

A half-cell in the form of a beaker cell was created using Polymers B (Example 9) and C (Example 10) having a polynorbornene main chain that were synthesized in Examples 2 and 3.

The half-cell created using Polymer B was charged at a constant current of 146 μA until the voltage reached −0.8 V, after which discharge at 146 μA was carried out. As a result, the voltage remained substantially constant for 50 seconds near −0.5 V and −0.1 V, after which it rose abruptly and the discharge capacity became 51 mAh/g. The coulombic efficiency was 88%.

A half-cell created using Polymer C was charged at a constant current of 146 μA until the voltage reached −0.75 V, after which discharge at 146 μA was carried out. As a result, the voltage was constant near −0.4 V and 0.1 V for about 130 seconds, after which it rose abruptly and the discharge capacity became 87 mAh/g. The coulombic efficiency was 81%.

Figure 6:
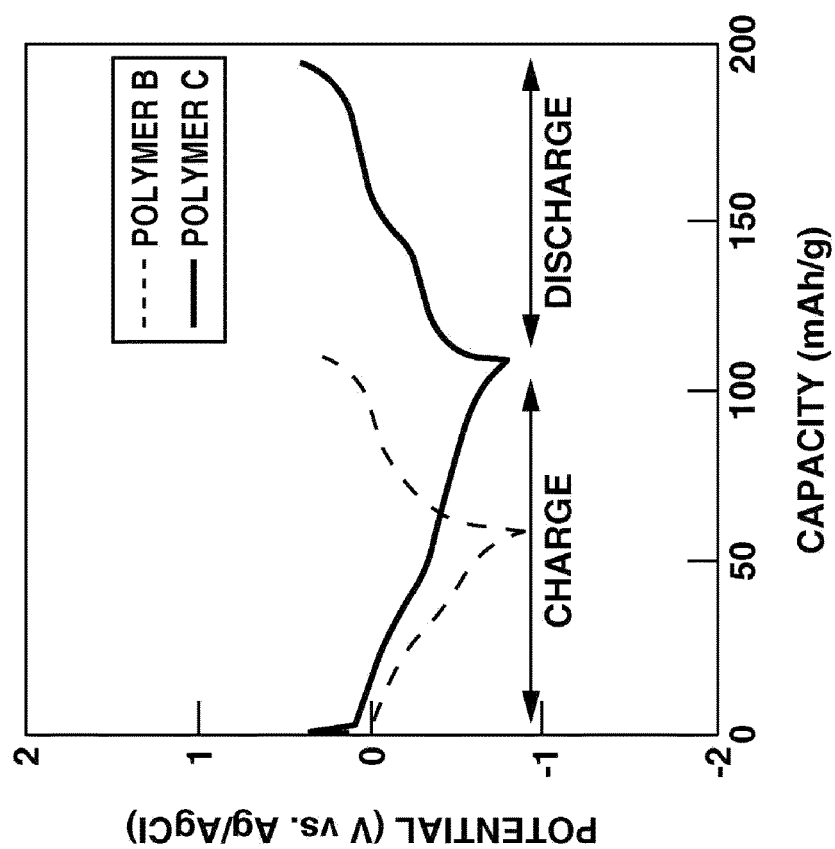
FIG. 6 is a graph showing the results of measurements of the potential difference with a reference electrode when the charge-discharge capacity was varied in the batteries produced in Examples 9 and 10.

From the above, it was confirmed that Polymer B and Polymer C function as charge storage materials. FIG. 6 shows the results of measurements of the potential difference with the reference electrode when the charge-discharge capacity was varied. In FIG. 6, the dashed line represents Example 9 (Polymer B) and the solid line represents Example 10 (Polymer C). When Polymer C was used, a higher charge-discharge capacity was exhibited, suggesting an increase in affinity to the solvent owing to the high degree of freedom of the side chains.

Example 11: Evaluation of Battery Produced Using Polymer C in Electrode (Coin Cell)

A polymer-lithium secondary battery was produced using the Polymer C/carbon composite electrode created in Example 8 as the positive electrode, metallic lithium as the negative electrode, and a 1 mol/L γ-butyrolactone solution of lithium perchlorate as the electrolyte solution. Production was carried out as follows. A polymer/carbon composite electrode was created on aluminum foil and cut out to a radius of 6 mm, and a separator was cut out to a radius of 8.5 mm. A plastic gasket, the carbon composite electrode, the separator, metallic lithium, a spacer and a washer were stacked in this order on a positive terminal case, following which a cap was set thereon and fully crimped using a crimping machine holder, thereby completing production of the polymer-lithium secondary battery.

Figure 7:
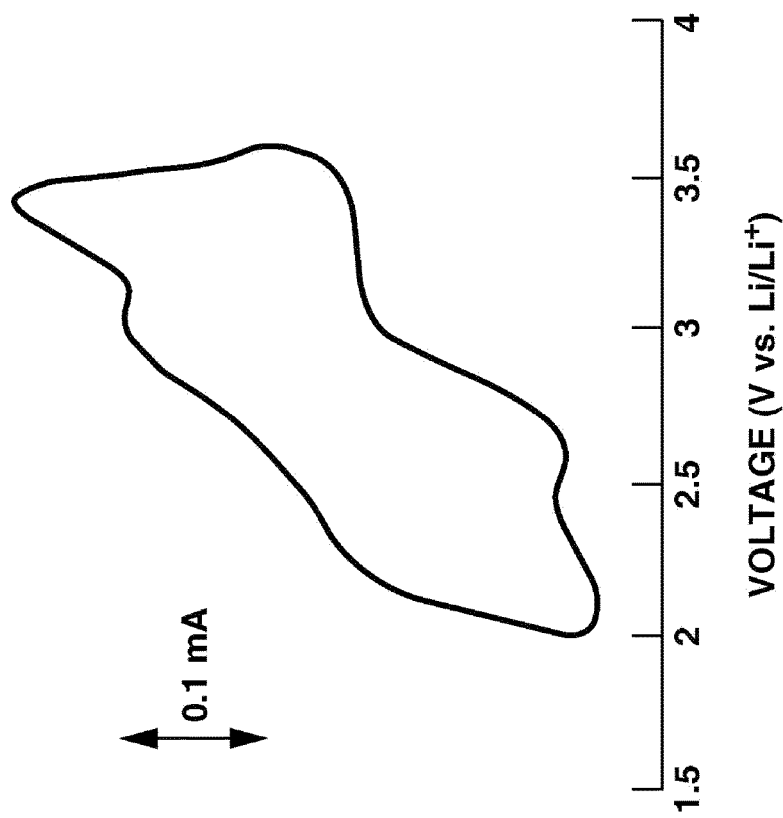
FIG. 7 is a cyclic voltammogram of the polymer-lithium secondary battery produced in Example 11.
Figure 8:
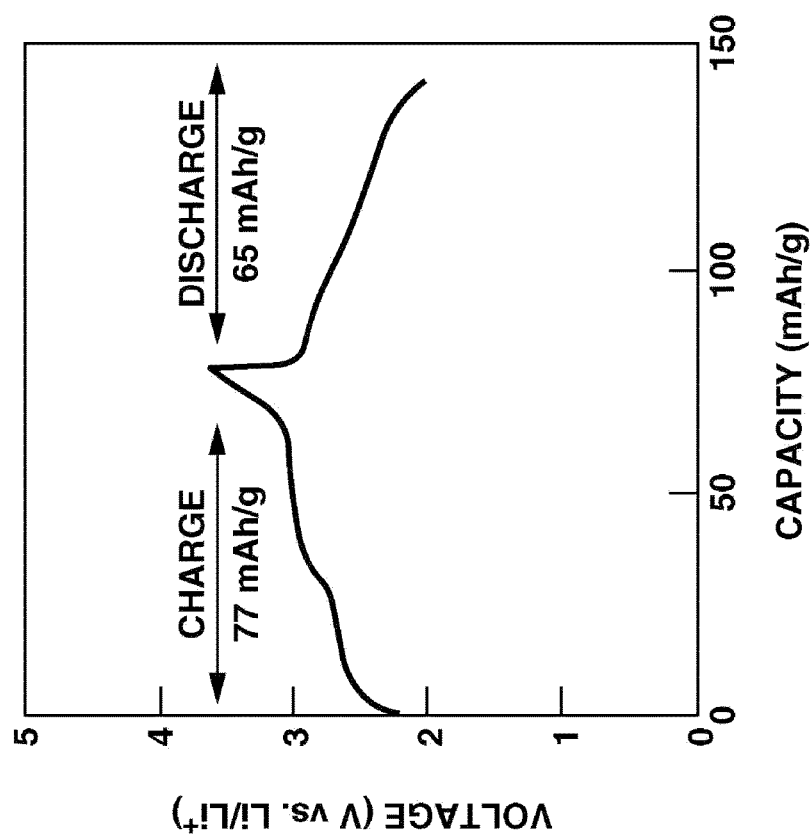
FIG. 8 is a graph showing the results of measurements of the potential difference with a reference electrode when the charge-discharge capacity was varied in the polymer-lithium secondary battery produced in Example 11.

Cyclic voltammetry was carried out at a sweep rate of 5 mV/sec, whereupon a two-step redox wave appeared. When chronopotentiometry was carried out at a fixed current of 293 μA and over a potential range of 2 V to 3.6 V, a two-step redox wave was observed. The discharge capacity was 65 mAh/g and the coulombic efficiency was 84%. FIG. 7 shows the results of cyclic voltammetry, and FIG. 8 shows the results of measurement of the potential difference with the reference electrode when the charge-discharge capacity was varied.

Example 12: Cyclic Voltammetry of Thin-Film Electrode Produced Using Polymer D Cyclic voltammetry was carried out using the beaker cell shown in FIG. 1.

Carbon powder (80 mg) and 10 mg of polyvinylidene fluoride binder dissolved in 1.5 g of NMP were added to 10 mg of Polymer D synthesized in Example 4, and kneaded in a ball mill. The mixture obtained after about 15 minutes of mixing was coated onto a glassy carbon substrate and vacuum dried under applied heat at room temperature (20° C.) for 12 hours, giving a thin-film electrode 11.

Next, the resulting electrode was immersed in an electrolyte solution, thereby impregnating the electrolyte solution into voids in the electrode. A 1 mol/L solution of γ-butyrolactone in lithium perchlorate was used as the electrolyte solution.

A beaker cell 1 like that shown in FIG. 1 was created by setting this thin-film electrode 11 as the working electrode, a platinum electrode 12 as the counter electrode and an Ag/AgCl electrode 13 as the reference electrode within a beaker, and adding thereto an electrolyte solution 14 similar to that described above.

Figure 9:
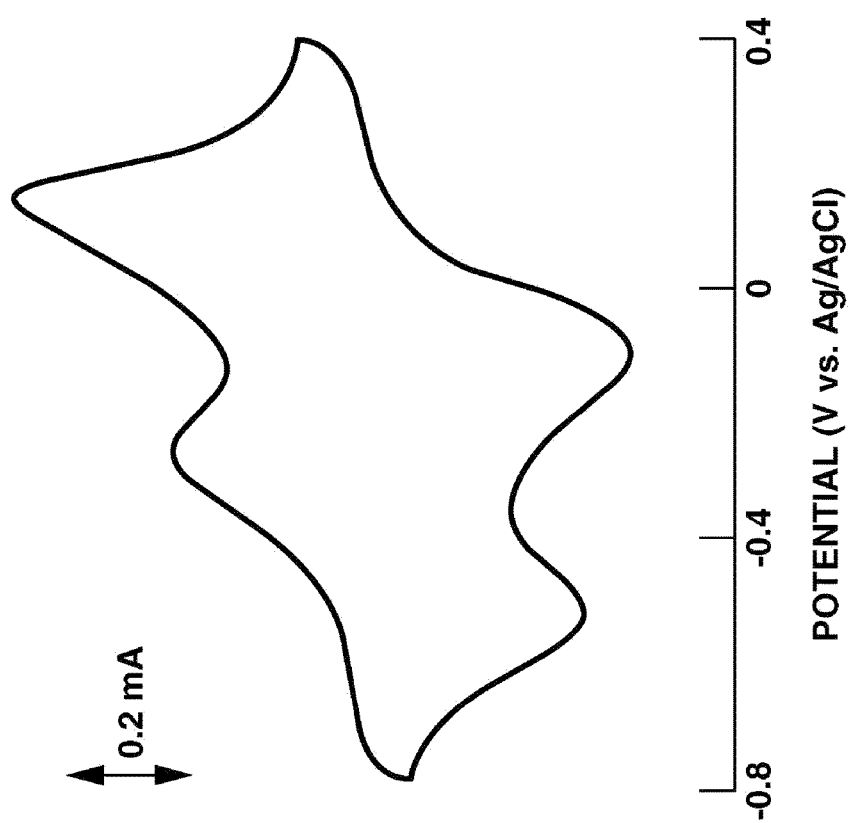
FIG. 9 is a cyclic voltammogram of the thin-film electrode produced in Example 12.

Using this beaker cell 1, cyclic voltammetry was carried out at a sweep rate of 10 mV/sec. The results are shown in FIG. 9. As is apparent from FIG. 9, for the thin-film electrode produced using Polymer D, $E_{1/2}$=0.02 V and a reversible redox wave appeared at −0.40 V.

Example 13: Evaluation of Battery Produced Using Polymer D as Electrode (Beaker Cell)

A half-cell in the form of a beaker cell was created using Polymer D synthesized in Example 4.

Figure 10:
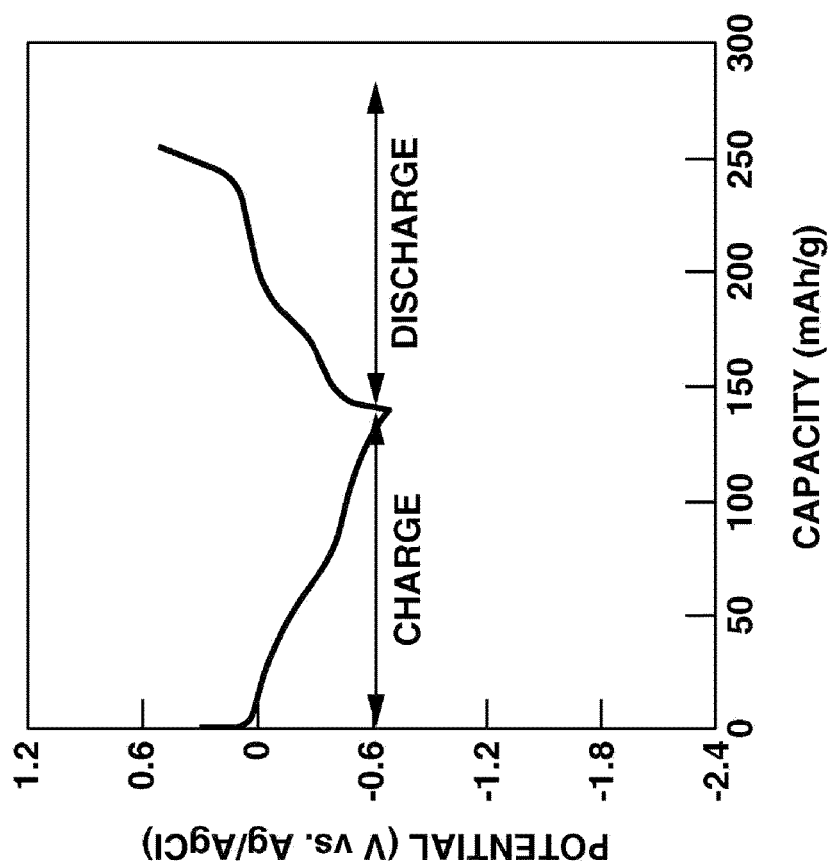
FIG. 10 is a graph showing the results of measurements of the potential difference with a reference electrode when the charge-discharge capacity was varied in the battery produced in Example 13.

The half-cell was charged at a constant current of 240 μA until the voltage reached −0.7 V, after which it was discharged at 240 μA. As a result, the voltage remained substantially constant near −0.4 V and 0 V for 140 seconds, after which it rose abruptly and the discharge capacity became 108 mAh/g. The coulombic efficiency was 77%. Polymer D was confirmed from this to function as a charge storage material. FIG. 10 shows the results of measurements of the potential difference with the reference voltage when the charge-discharge capacity was varied.

Figure 11:
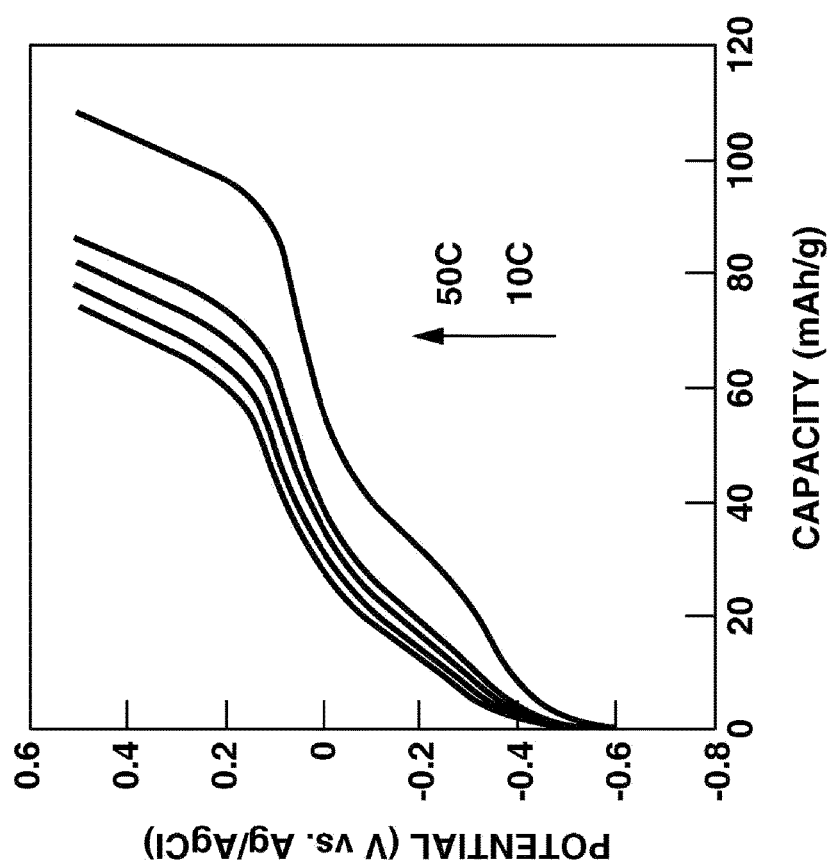
FIG. 11 shows discharge curves at discharge rates of 10, 20, 30, 40 and 50 C in the battery produced in Example 13.

Charging at constant currents of 480 μA, 720 μA, 960 μA and 1,200 μA was similarly carried out, and the discharge capacity at 20 C to 50 C was measured. Because the results showed that, even at 50 C, the discharge capacity was about 70% of the discharge capacity at 10 C, one would expect that electron exchanges from the close structure are taking place. FIG. 11 shows the discharge curve at a discharge rate of 10 C to 50 C.

Example 14: Evaluation of Battery Produced Using Polymer D as Electrode (Coin Cell)

A polymer-lithium secondary battery was produced using the Polymer D/carbon composite electrode created in Example 12 as the positive electrode, metallic lithium as the negative electrode, and a 1 mol/L γ-butyrolactone solution of lithium perchlorate as the electrolyte solution. The polymer-lithium secondary battery was produced in accordance with the method of Example 11.

Figure 12:
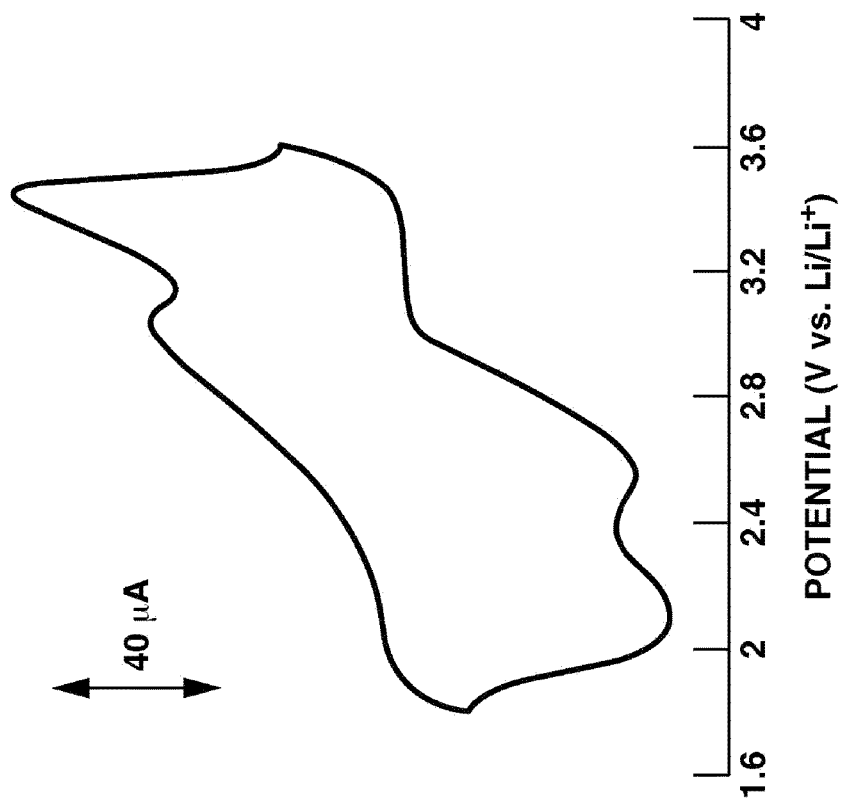
FIG. 12 is a cyclic voltammogram of the polymer-lithium secondary battery produced in Example 14.
Figure 13:
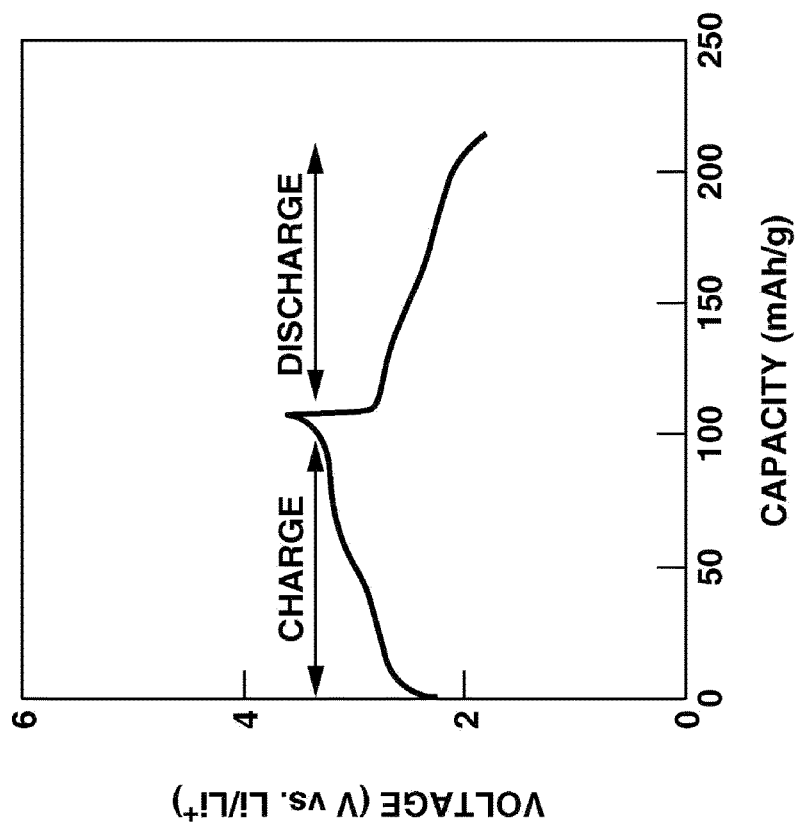
FIG. 13 is a graph showing the results of measurements of the potential difference with a reference electrode when the charge-discharge capacity was varied in the polymer-lithium secondary battery produced in Example 14.

Cyclic voltammetry was carried out at a sweep rate of 5 mV/sec, whereupon a redox wave appeared at a position corresponding to the potential difference between both electrodes. In addition, chronopotentiometry was carried out at a constant current of 111 μA over a range in potential of 1.8 V to 3.6 V, whereupon a two-step redox wave was observed. The discharge capacity was 104 mAh/g and the coulombic efficiency was 95%. FIG. 12 shows the cyclic voltammetry results, and FIG. 13 shows the results of measurements of the potential difference with the reference electrode when the charge-discharge capacity was varied.

Japanese Patent Application No. 2015-200078 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A fused-ring quinone-substituted polynorbornene having recurring units of formula (1) and/or (2) below

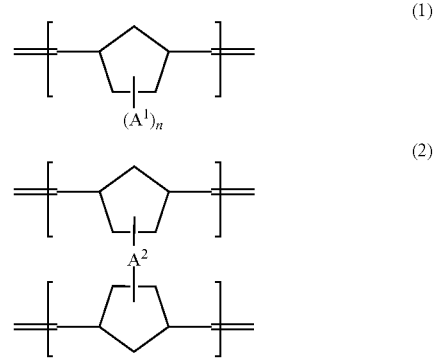

wherein each $A^1$ is independently a substituent of formula (3) or (4) below, n is an integer from 1 to 6, and $A^2$ is a substituent of formula (5) or (6) below

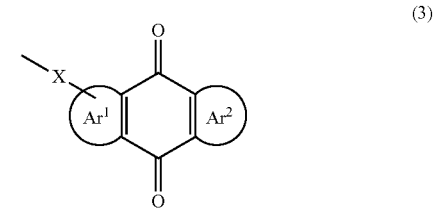

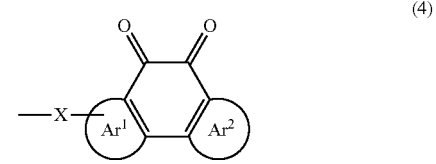

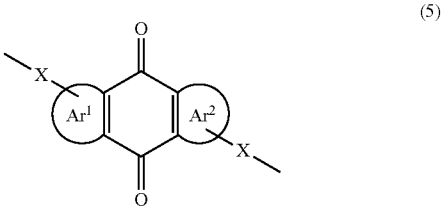

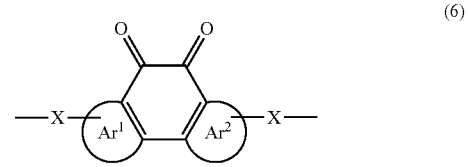

wherein each X is independently a single bond or a divalent group, and $Ar^1$ and $Ar^2$ are each independently an aromatic hydrocarbon ring or an oxygen atom- or sulfur atom-containing aromatic heterocycle that forms together with two carbon atoms on a benzoquinone skeleton, provided that when $A^1$ is a substituent of formula (3) and $Ar^1$ and/or $Ar^2$ are benz moieties, the recurring units of formula (1) are recurring units of formula (1-1) below

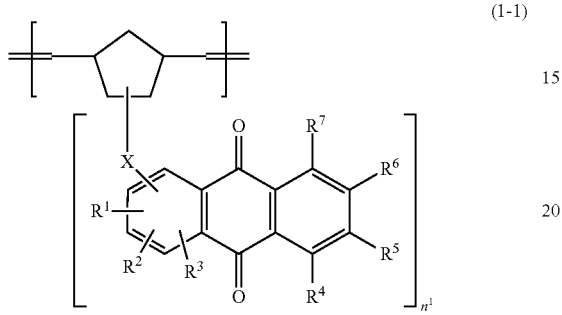

(1-1)

wherein X is as defined above, $R^1$ to $R^7$ are each independently a hydrogen atom, a halogen atom, a hydroxyl group, a mercapto group, an amino group, a substituted or unsubstituted alkyl group of 1 to 12 carbon atoms, a substituted or unsubstituted alkenyl group of 2 to 12 carbon atoms, a substituted or unsubstituted alkynyl group of 2 to 12 carbon atoms, a substituted or unsubstituted aryl group of 6 to 12 carbon atoms, a substituted or unsubstituted heteroaryl group of 3 to 12 carbon atoms, a substituted or unsubstituted alkoxy group of 1 to 12 carbon atoms, a substituted or unsubstituted alkylthio group of 1 to 12 carbon atoms, a substituted or unsubstituted monoalkylamino group of 1 to 12 carbon atoms, a dialkylamino group in which each alkyl group is independently a substituted or unsubstituted alkyl group of 1 to 12 carbon atoms, or an alkylcarbonyl group of 2 to 12 carbon atoms, and $n^1$ is 2.

2. The fused-ring quinone-substituted polynorbornene of claim 1, wherein the aromatic hydrocarbon ring is a benzene ring and the aromatic heterocycle is a thiophene ring.

3. The fused-ring quinone-substituted polynorbornene of claim 2 which contains recurring units of formula (1-2) and/or (1-3) below

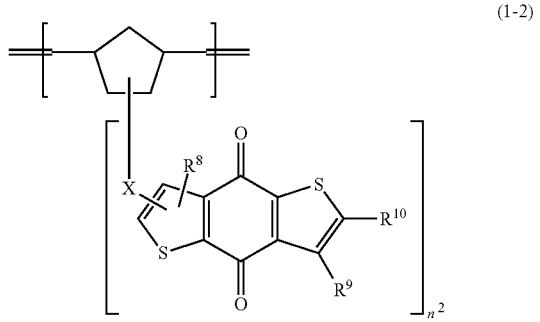

(1-2)

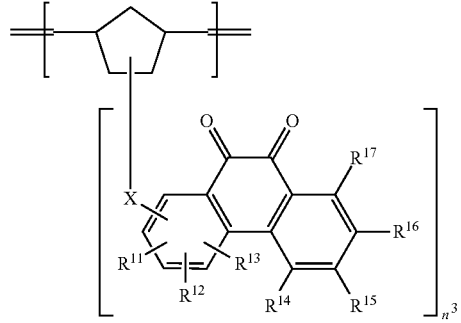

(1-3)

wherein X is as defined above; $R^8$ to $R^{17}$ are each independently a hydrogen atom, a halogen atom, a hydroxyl group, a mercapto group, an amino group, a substituted or unsubstituted alkyl group of 1 to 12 carbon atoms, a substituted or unsubstituted alkenyl group of 2 to 12 carbon atoms, a substituted or unsubstituted alkynyl group of 2 to 12 carbon atoms, a substituted or unsubstituted aryl group of 6 to 12 carbon atoms, a substituted or unsubstituted heteroaryl group of 3 to 12 carbon atoms, a substituted or unsubstituted alkoxy group of 1 to 12 carbon atoms, a substituted or unsubstituted alkylthio group of 1 to 12 carbon atoms, a substituted or unsubstituted monoalkylamino group of 1 to 12 carbon atoms, a dialkylamino group in which each alkyl group is independently a substituted or unsubstituted alkyl group of 1 to 12 carbon atoms, or an alkylcarbonyl group of 2 to 12 carbon atoms; and $n^2$ and $n^3$ are each independently 1 or 2.

4. A charge storage material comprising the fused-ring quinone-substituted polynorbornene according to claim 1.

5. An electrode active material comprising the charge storage material of claim 4.

6. An electrode slurry comprising the electrode active material of claim 5 and a solvent.

7. A thin-film comprising the electrode active material of claim 5.

8. A thin-film produced from the electrode slurry of claim 6.

9. An electrode comprising the electrode active material of claim 5.

10. An electrode comprising the thin-film of claim 7.

11. A secondary battery comprising the electrode of claim 9.

12. A lithium ion battery comprising the electrode of claim 9.

13. An air battery comprising the electrode of claim 9.

* * * * *